Figure 1:
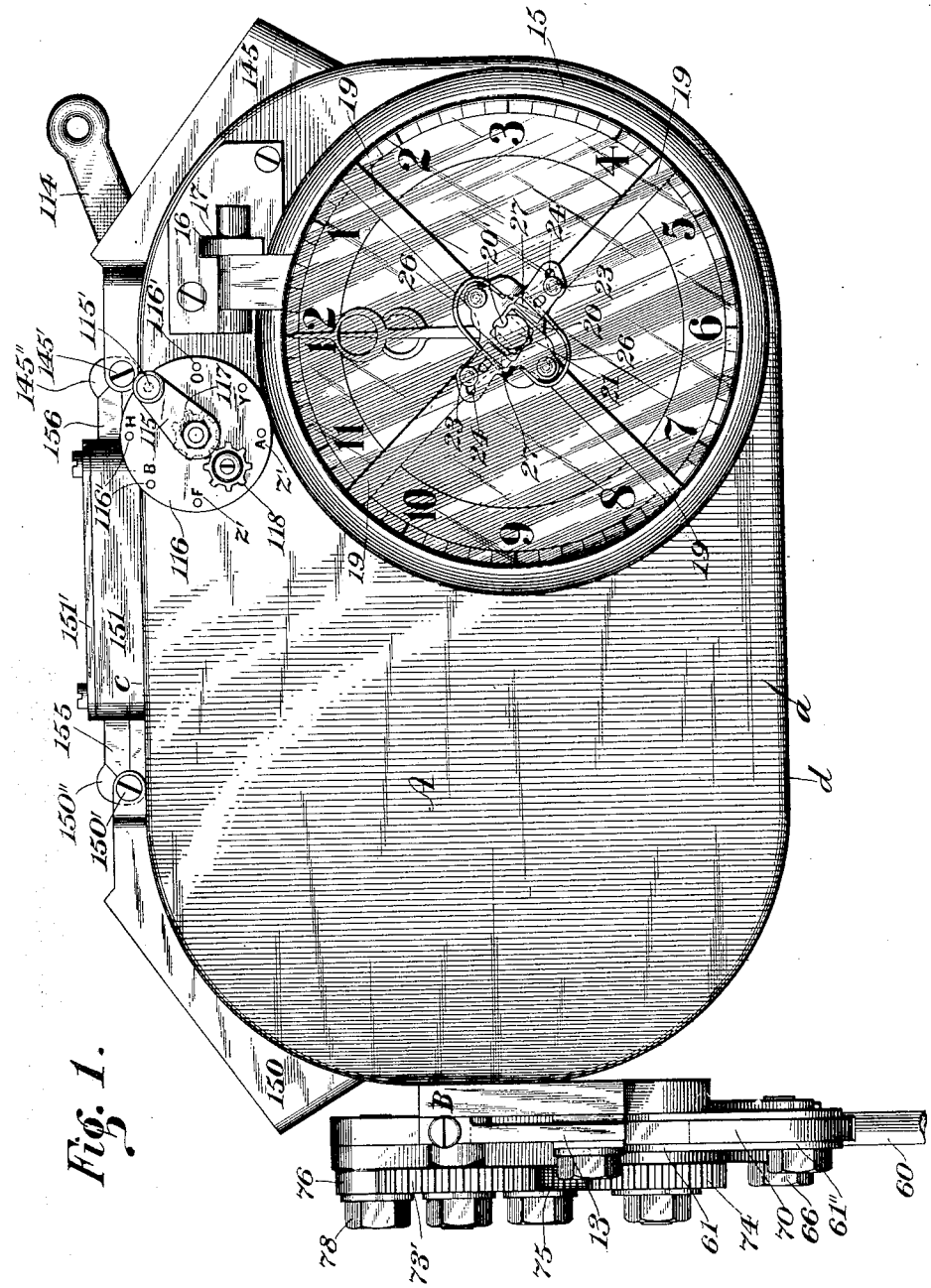

No. 672,586.

Patented Apr. 23, 1901.

H. L. ARNOLD.
RECORDER.
(Application filed Apr. 23, 1900.)

(No Model.)

12 Sheets—Sheet 1.

Witnesses:
H. Roy Appleman Jr.
C. A. Weed

Inventor,
Horace L. Arnold,
By his Attorney,
F. H. Richards.

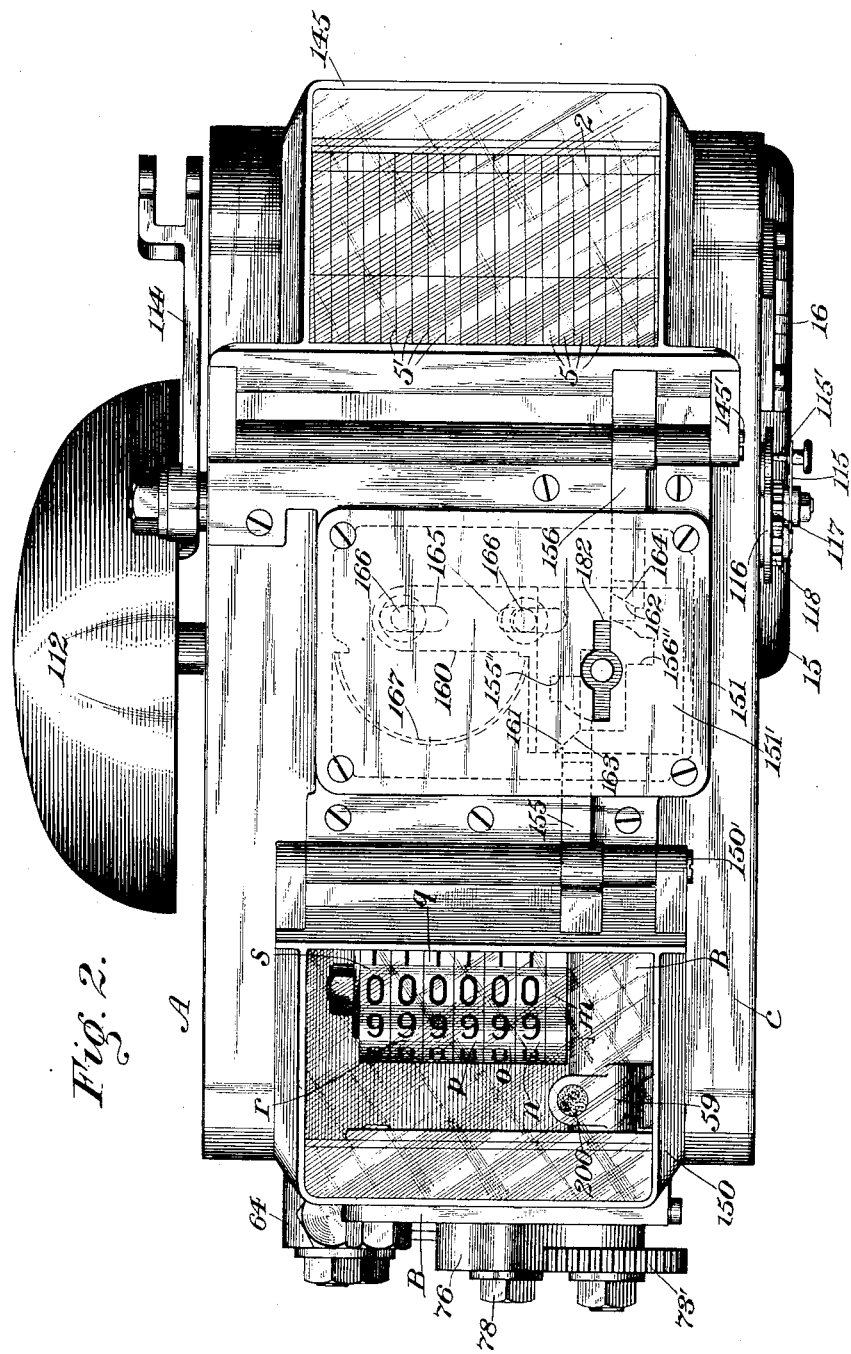

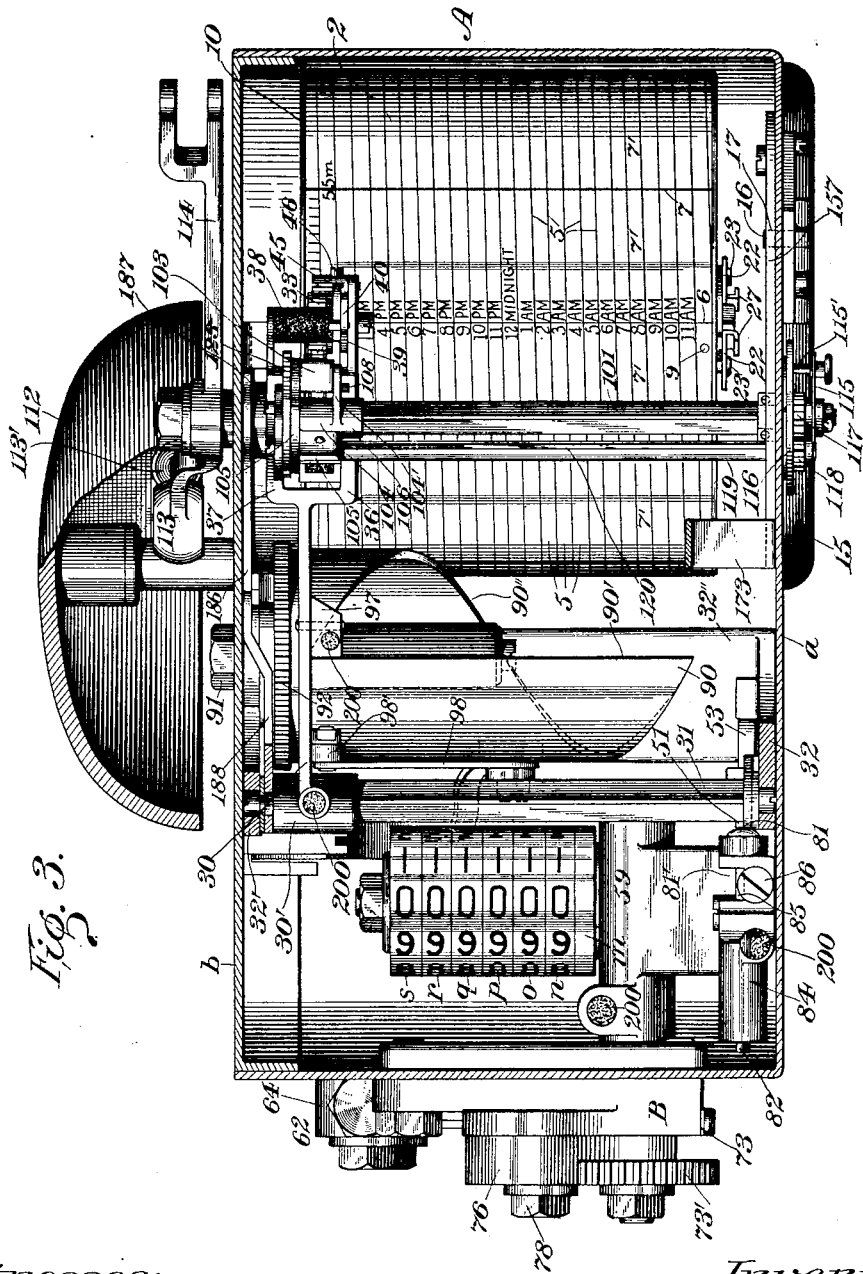

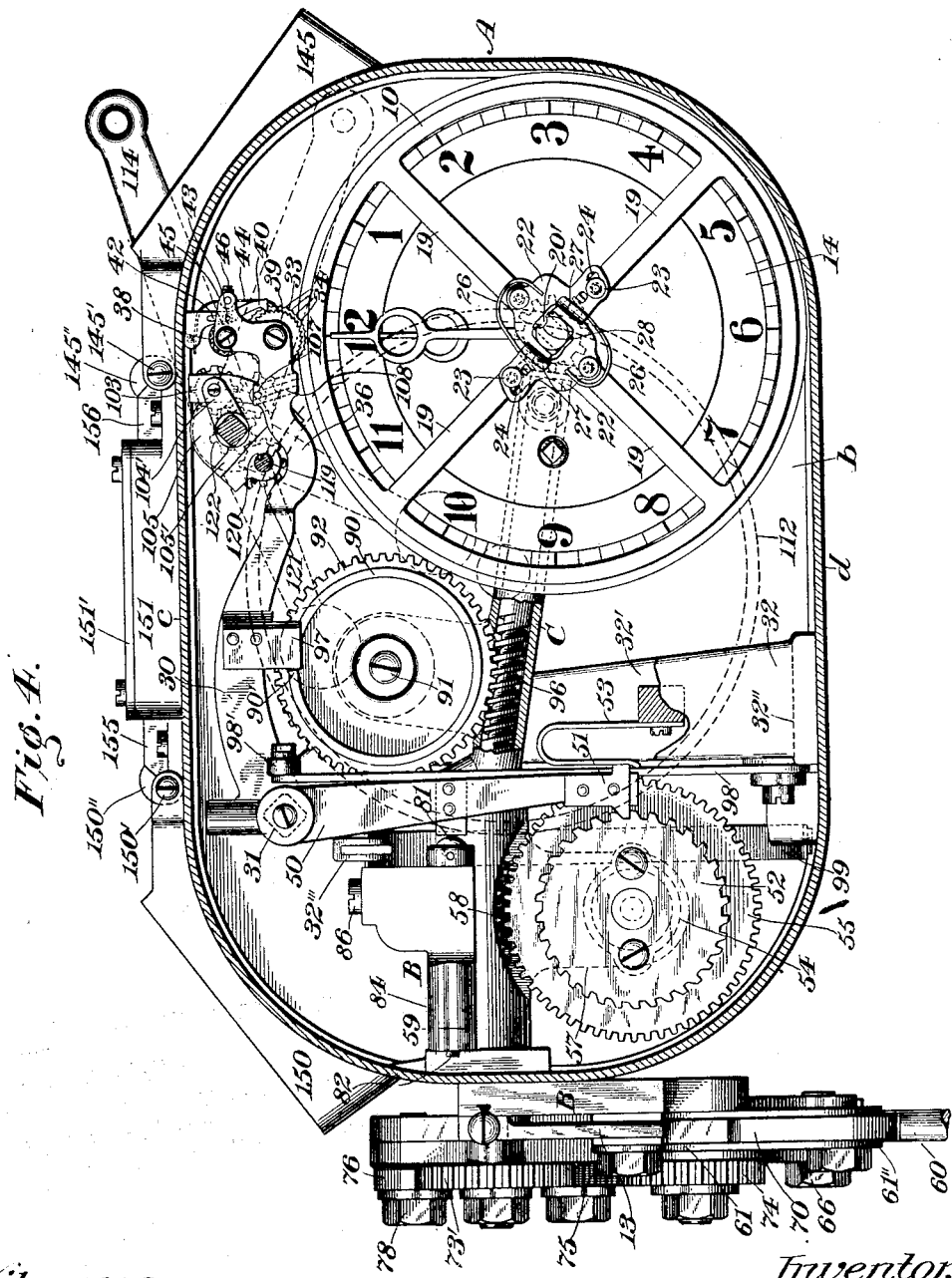

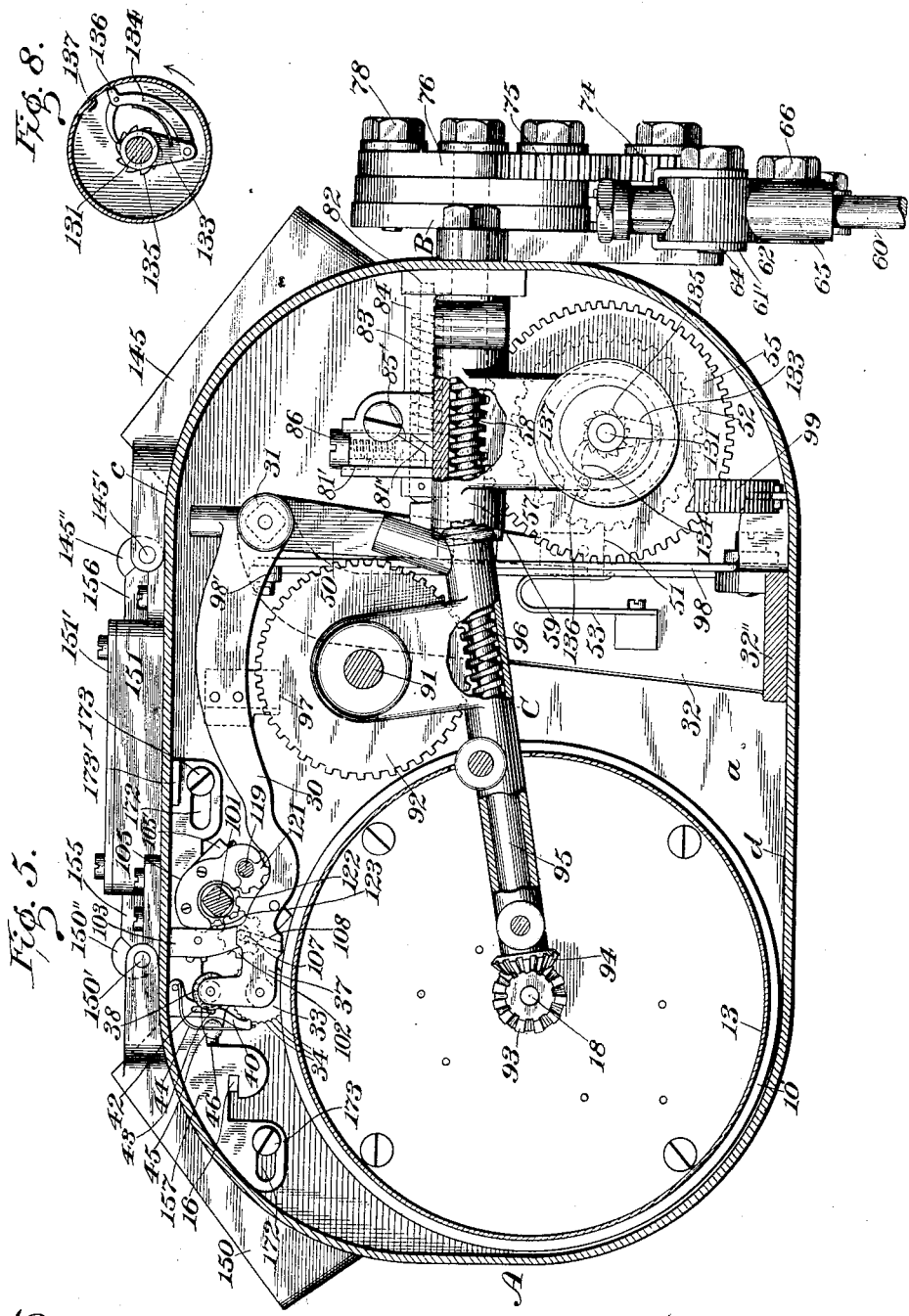

No. 672,586. Patented Apr. 23, 1901.
H. L. ARNOLD.
RECORDER.
(Application filed Apr. 23, 1900.)
(No Model.) 12 Sheets—Sheet 6.
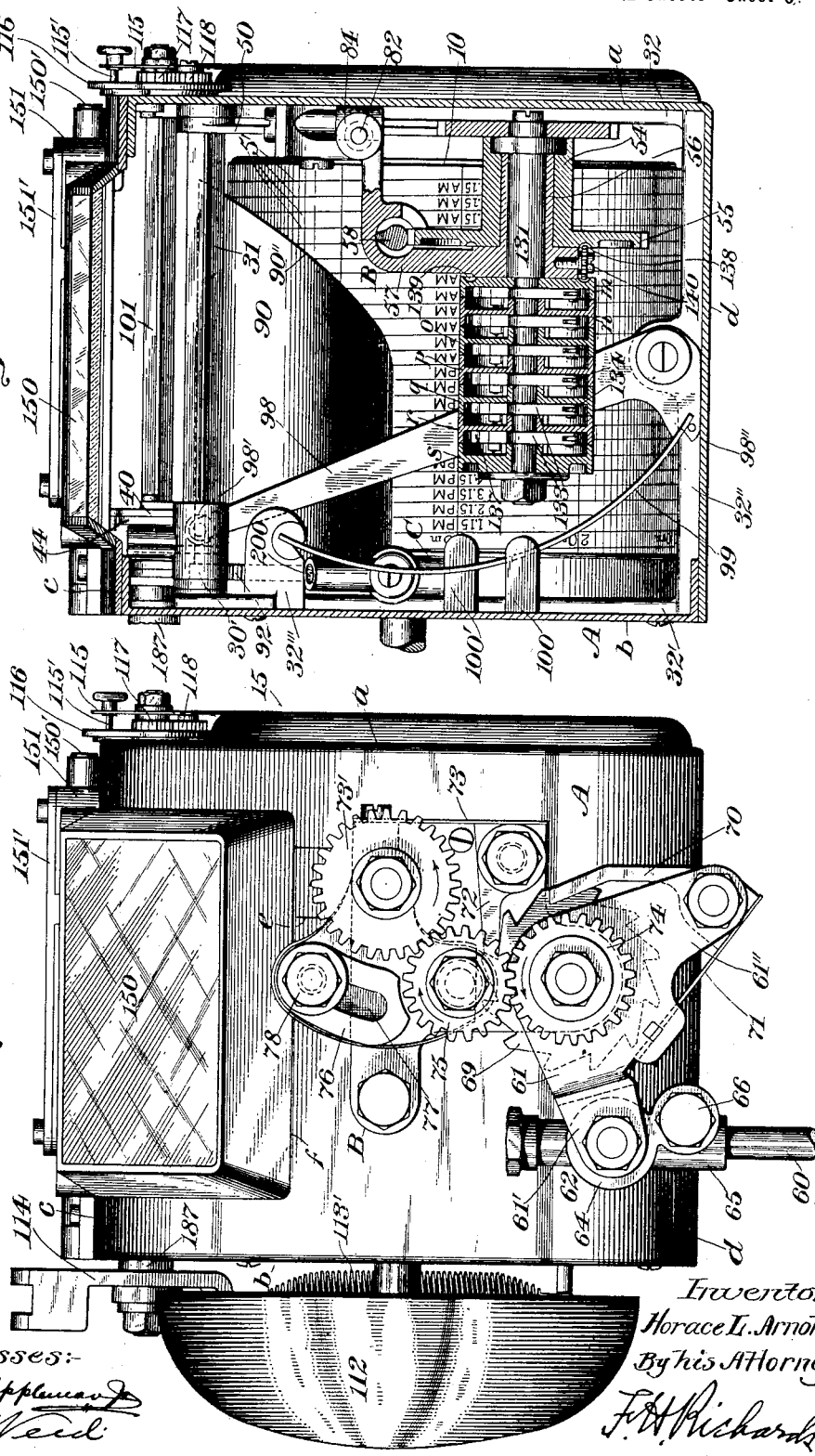

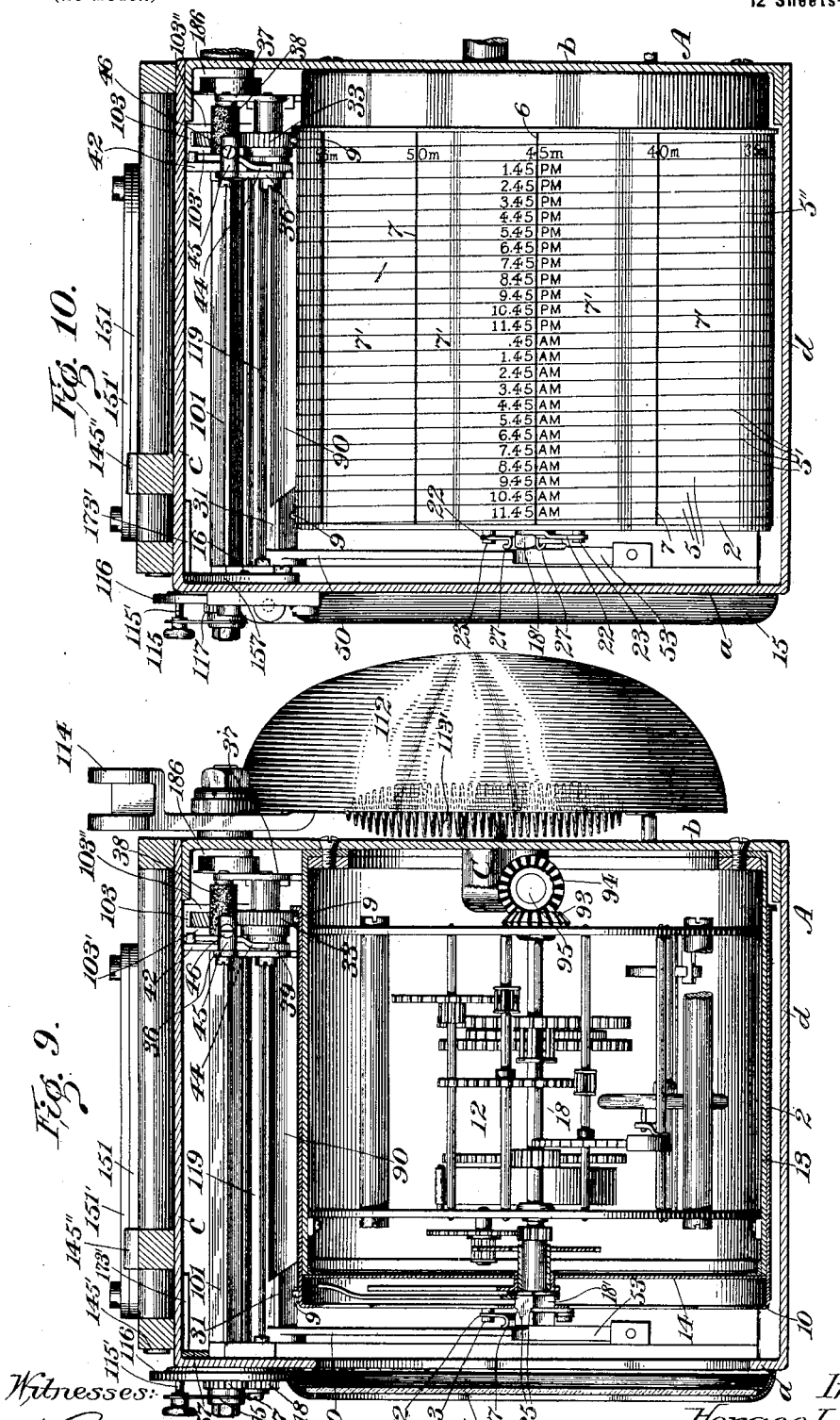

No. 672,586. Patented Apr. 23, 1901.
H. L. ARNOLD.
RECORDER.
(Application filed Apr. 23, 1900.)

(No Model.) 12 Sheets—Sheet 8.

Witnesses:
A. Roy Appleman
C. A. Weed

Inventor,
Horace L. Arnold,
By his Attorney
F. N. Richards.

THE NORRIS PETERS CO., PHOTO-LITHO., WASHINGTON, D. C.

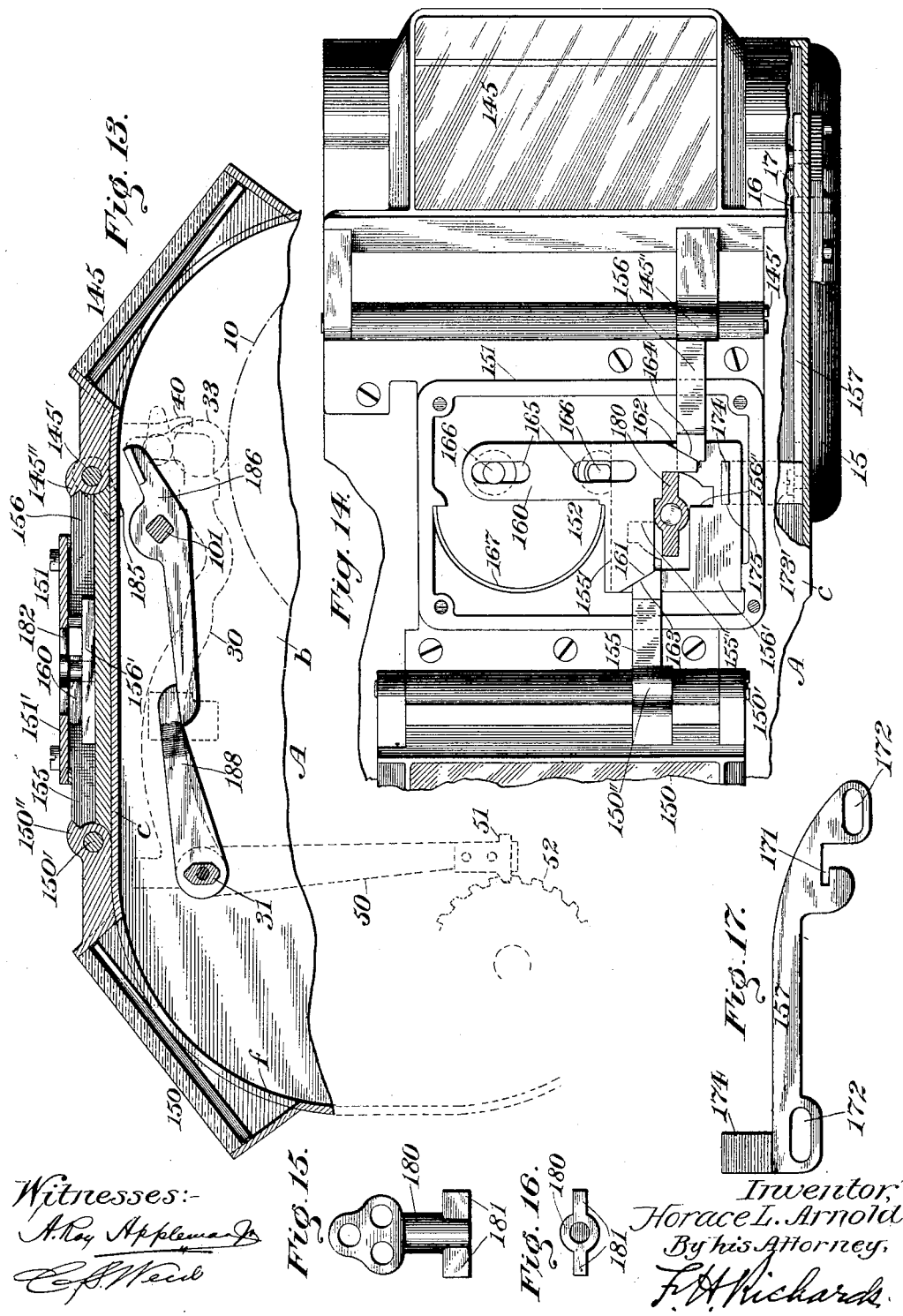

No. 672,586. Patented Apr. 23, 1901.
H. L. ARNOLD.
RECORDER.
(Application filed Apr. 23, 1900.)
(No Model.) 12 Sheets—Sheet 10.
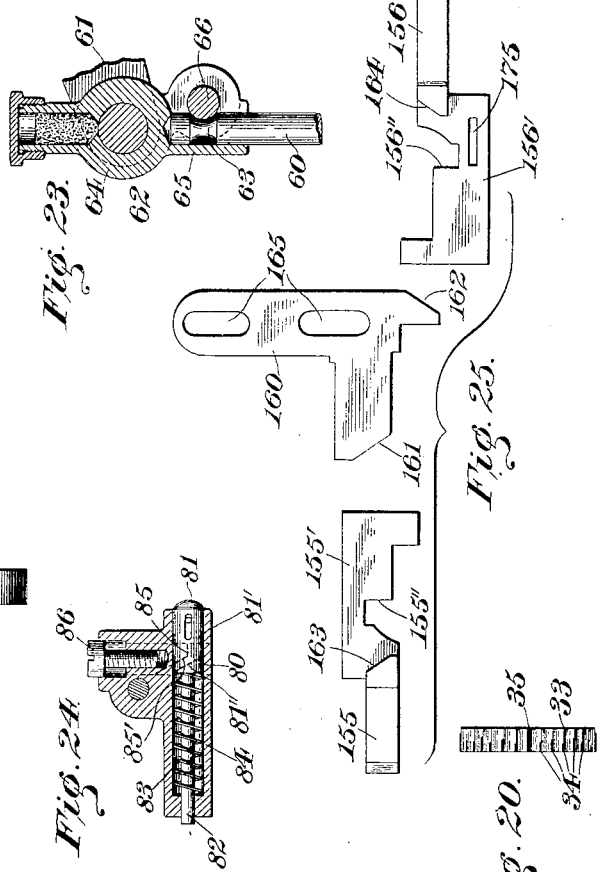
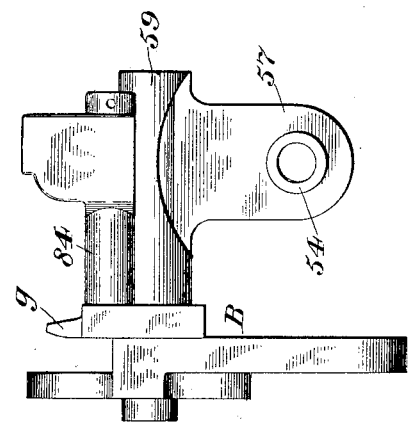
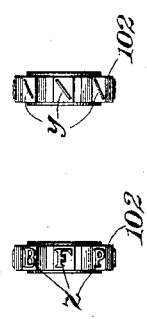
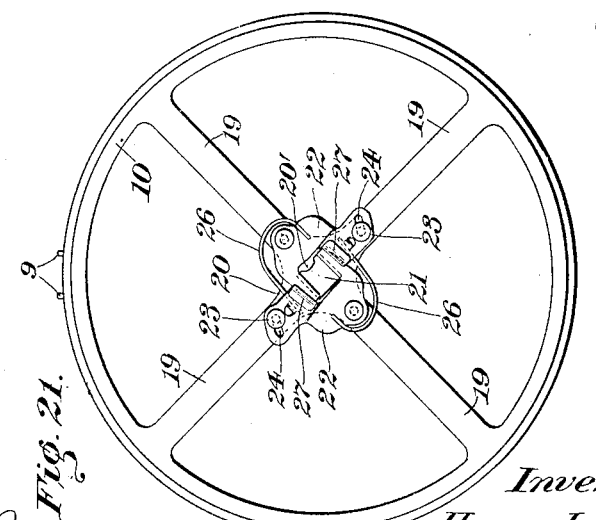
Witnesses:
Inventor:
Horace L. Arnold.
By his Attorney, No. 672,586. Patented Apr. 23, 1901.
H. L. ARNOLD.
RECORDER.
(Application filed Apr. 23, 1900.)
(No Model.) 12 Sheets—Sheet 12.
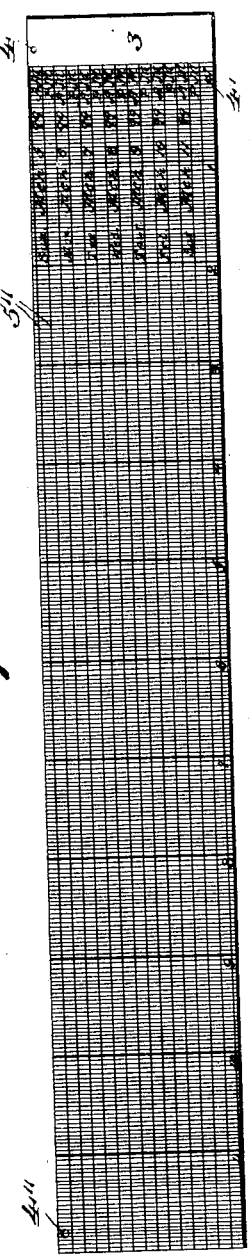
Fig. 28.
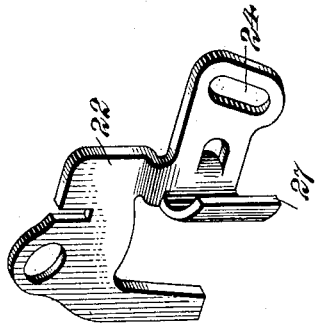
Fig. 31.
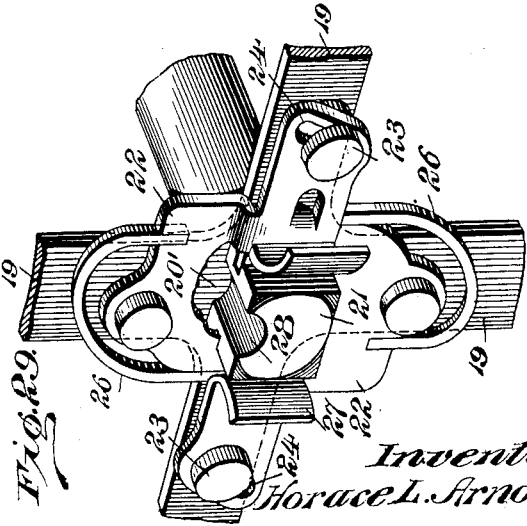
Fig. 30.
Fig. 29.
Witnesses:
H. G. Dieterich
F. H. Harland
Inventor
Horace L. Arnold
By his Attorney
F. H. Richards.

UNITED STATES PATENT OFFICE.

HORACE L. ARNOLD, OF BROOKLYN, NEW YORK.

RECORDER.

SPECIFICATION forming part of Letters Patent No. 672,586, dated April 23, 1901.

Application filed April 23, 1900. Serial No. 13,904. (No model.)

*To all whom it may concern:*

Be it known that I, HORACE L. ARNOLD, a citizen of the United States, residing in the borough of Brooklyn, in the county of Kings and State of New York, have invented certain new and useful Improvements in Recorders, of which the following is a specification.

This invention relates to recorders or registers adapted for use with vehicles of various constructions, but particularly adapted for mechanically-propelled vehicles—such as automobiles, street-railway cars, &c.—although it can be effectively used in connection with horse-drawn vehicles, the present improvement being designed to furnish a record of the time of starting, the rate of progress, and the time of stopping of the vehicle, together with a record of the sounding of an alarm, such as a bell or other warning-signal; and one object of the invention is to provide an improved instrument which will record certain events and the time of their occurrence in plain printed characters, so as to be easily and quickly read by those not possessed of special technical training.

A further object of the invention is to provide a recorder comprising an improved timepiece-actuated record-sheet provided with separate time-spaces denoting similar periods of time duration and an improved event or performance impression producing mechanism actuated on the occurrence of the event to print on the record-sheet in the particular space corresponding to the time in which the event occurred a mark, symbol, or character indicating the occurrence of such event.

A further object of the invention is to provide a recorder comprising record-sheet mechanism comprehending a timepiece and a record-sheet actuated thereby and provided with separate time-spaces denoting similar periods of time duration, an event or performance impression producing mechanism actuated on the occurrence of the event to print on the record-sheet in the particular space corresponding to the time in which the event occurred a mark, symbol, or character indicating the occurrence of such event, means operative to shift one of said mechanisms laterally or transversely of the other, thereby to obtain the printing of such marks, symbols, or characters in lateral paths on the record-sheet, and means for returning the shifted mechanism to its starting position.

A further object of the invention is to provide a recorder comprising a timepiece-actuated drum carrying a record-sheet and an improved speed-recording mechanism organized for connection with a moving or rotary part of a vehicle and operative to produce a record of the rate of progress of such vehicle.

A further object of the invention is to provide a recorder comprising a timepiece-actuated drum carrying a record-sheet and an improved alarm-recording mechanism organized for connection with an alarm or other warning-signal and operative to produce a record of the use of such warning-signal or alarm.

A further object of the invention is to provide a recorder with a number of improved features embodying, among others, an improved record-sheet mechanism, an improved speed-recording mechanism effective to accurately record the speed of a vehicle, together with the time of starting and stoppage thereof, an alarm or warning-signal recording mechanism, and trip-indicating mechanism, each of which mechanisms also embodies various novel features.

Figure 11:
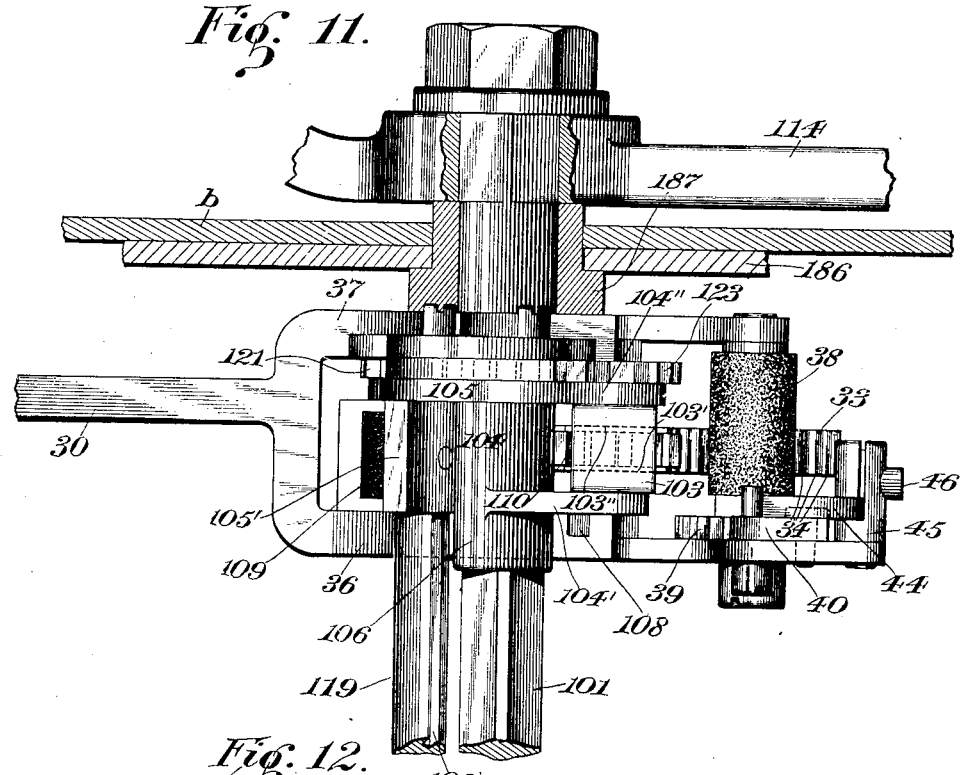
Figure 12:
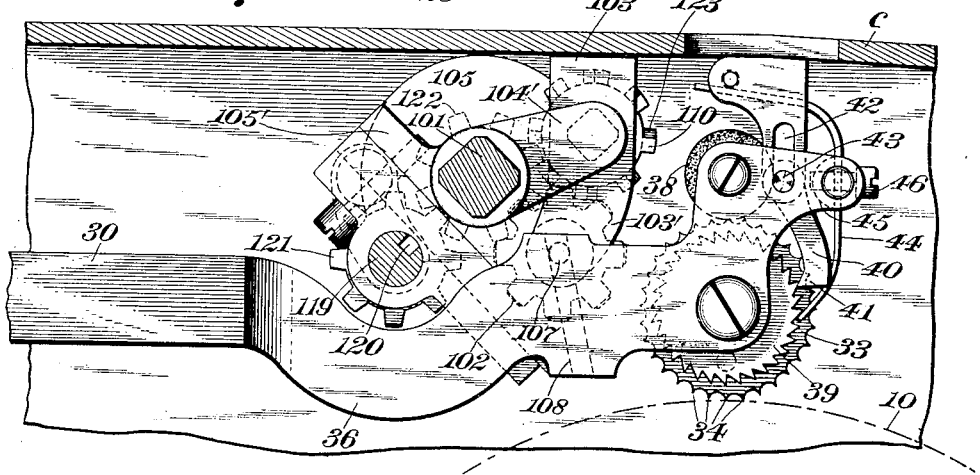
Figure 26:
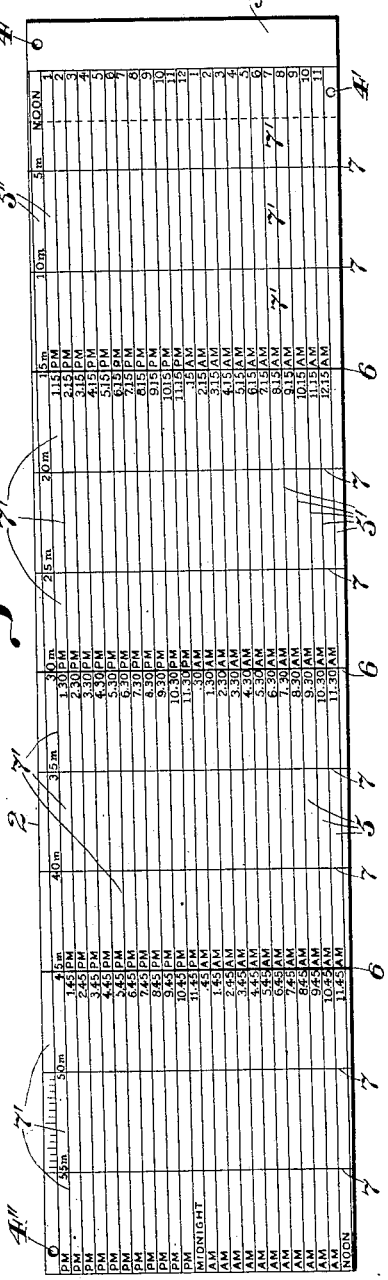
Figure 27:
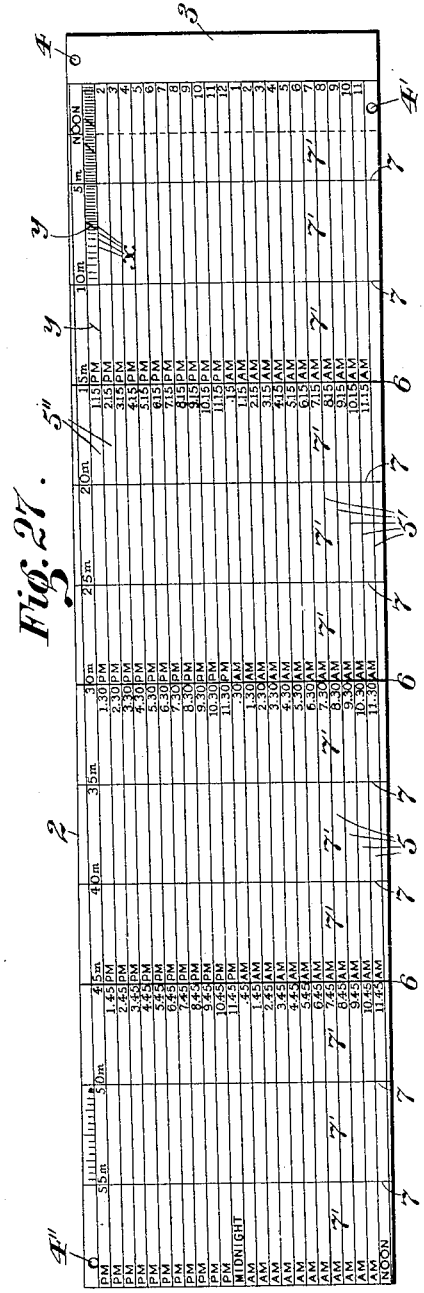

In the drawings accompanying and forming part of this specification, Figure 1 is a front view of this improved recorder as it may appear when organized for use with a road-vehicle, such as an automobile. Fig. 2 is a top view thereof with the door-locking means shown in dotted lines. Fig. 3 is a top view of the assembled mechanisms with the top of the casing removed. Fig. 4 is a front or face view of the assembled mechanisms with the front of the casing removed. Fig. 5 is a rear view of the assembled mechanisms with the back or rear of the casing removed. Fig. 6 is an end view of the recorder, showing the mechanism which transmits motion from a rotary part or wheel of the vehicle to the speed-recording mechanism. Fig. 7 is an end view of the assembled mechanisms with the end of the casing shown in Fig. 6 removed, the mile-cyclometer being shown in section. Fig. 8 is a cross-sectional view of one of the cyclometer-wheels shown in said Fig. 7. Fig. 9 is an end view of the assembled mechanisms opposite to that shown in Fig. 7 with the end of the casing removed, the record-sheet-carrying drum being shown in section. Fig. 10 is an end view similar to Fig. 9 with a record-sheet in position on its drum. Fig. 11 is a detail plan view, enlarged, of the speed and alarm recording printing means. Fig. 12 is a side view thereof. Fig. 13 is a sectional view of the upper portion of the recorder-casing, together with the mechanism for raising the printing mechanism on the opening of one of the doors of such casing. Fig. 14 is a top view of a portion of said casing, together with the door-locking mechanism. Figs. 15 and 16 are side and end views, respectively, of a key adapted for use in connection with this improved triple lock. Fig. 17 is a side view of the dial-door-locking bolt. Fig. 18 is a view of the alarm-printing wheel when constructed for use as a trip-indicator. Fig. 19 is a view of such printing-wheel when constructed for use with an automobile or other road-vehicle. Fig. 20 is a view of the speed-printing wheel. Fig. 21 is a view of the record-sheet-carrying drum, together with the means for maintaining the same on the hand-carrying post or shaft of the timepiece. Fig. 22 is a view of one of the castings which may be used to support the transmitting mechanism intermediate the wheel or rotary part of the vehicle and the printing or impression mechanism. Fig. 23 is a view of the connection intermediate the rotary part or wheel of the vehicle and the transmitting-gear bell-crank. Fig. 24 is a view of the buffer and its casing used in connection with the speed-recording mechanism. Fig. 25 is a view of each of the door-bolts and its tumbler. Figs. 26 and 27 are views of the record-sheet, Fig. 27 illustrating the sheet partly printed upon. Fig. 28 is a view of another form of record-sheet which may be used. Figs. 29 and 30 are detail views of the drum-holding means, and Fig. 31 is a detail of the bell-crank carrying the alarm-recording devices.

Similar characters of reference indicate corresponding parts in the different figures of the drawings.

The object of the invention, as above set forth, is to produce a record of events and the time of their occurrence in plain printed characters, so as to be easily read by persons not possessed of special technical training.

There are now in use various speed-recorders in which a pen or analogous instrument is used to make a waved line on paper secured to a drum rotating at a uniform time rate. While said record may be accurate, it, however, cannot be read at sight, but must be measured and interpreted by a person having special knowledge of this form of diagram.

In the present improvement an entirely different method is pursued, with the result of producing a plainly-printed record-sheet accurately exhibiting the occurrence of one or more events, the mechanism being adapted to record the occurrence and frequency of various events upon a single record sheet or card, the present mechanism, however, being more especially constructed for the production of a record of the time of starting, rate of progress, and time of stopping a vehicle of any description, while at the same time keeping a correct record of the sounding of an alarm, such as a bell or other warning-signal, as well as indicating the number of miles traveled by the vehicle. The means employed for producing this record comprise a record sheet or card which is appropriately inscribed on its face before placing in the machine and further imprinted during the progress of the vehicle by a plurality of printing mechanisms shown herein, independent of each other, one for each series of events which are to be recorded. The record-sheet is in operative connection with and is actuated by a timepiece or time mechanism and is moved at a uniform rate of speed thereby.

The printing mechanisms, which record the occurrence of events by making impressions on the record-sheet, are actuated on the occurrence of the events themselves and hence produce their record on the sheet in times of their own entirely independent of the uniform travel of the record-sheet and by their varied location of such impressions on the sheet and by the variation of the intervals separating the impressions thus made on the sheet give an accurate record of the rate of progress of the vehicle and the sounding of the alarm or other signal.

In the case of many vehicles—as, for instance, an automobile or a street or other railway car—there are two wholly different series of events to be recorded—first, the starting of the vehicle, its rate of progress so long as it continues to advance, and its stoppages, and, second, the sounding of the alarm. It is of the greatest importance to the manager of a street-railway line that he should be able to know certainly the time of the beginning and ending of each trip of his cars and also the rates of speed at which such cars are run, it being also in case of accident of very great importance to have an indisputable record of the alarm as well as the velocity of the vehicle at the time of the occurrence of the accident. Hence in the present improvement two entirely independent sets of record-printing mechanisms are employed—the one actuated by a rotary part or wheel of the vehicle and the other actuated on the sounding of the alarm—each producing a record on the record-sheet in a proper time division thereof, so that a plainly-printed record is produced, which can be easily and quickly read by any person of ordinary intelligence, whereby it is capable of being used as indisputable evidence in court or to persons without special technical training.

The rate of vehicle progress is always a matter of uncertainty when judged by the eye only, and an accurate mechanically-produced record of the vehicle speed is of the utmost importance in case of accident and is also of great significance to managers of street-railway cars, who wish as nearly as possible a uniform rate of speed to be maintained, and they are therefore especially interested in the work of each motorman, since he may from motives of his own run at very low rates of speed during certain portions of his routes and at much higher rates than the rules of the road permit over other portions thereof. It is also very desirable that the rate of speed at which hired vehicles have been driven should be certainly known to the owners, as well as the total distance traveled and other particulars, which can be readily ascertained by the use of the present improvement.

This improved recorder in the form shown and which may be its preferred form, if desired, includes improved record-sheet means or mechanism embodying a record-sheet and a timepiece or time mechanism for shifting said record-sheet, improved speed-recording means or mechanism, and improved alarm-recording means or mechanism. In the present instance, also, the recorder embodies in connection with the alarm-recording mechanism a trip-recording means or mechanism to indicate the particular trip during which the alarm is sounded.

Since it is desired when the recorder is used in connection with road-vehicles, such as automobiles, to know the distance which the vehicle has traveled, the recorder may in the form shown embody, in combination with its other recording mechanisms, a cyclometer of any desired or preferred construction.

Various forms of record-sheet may be used in practice upon which the record of the occurrence of the various events may be imprinted, and while it is of course desired that a recording-machine should be as small as possible it is nevertheless absolutely necessary, if the machine is to furnish a record of value as evidence in a court of law, that there should be space enough given upon the sheet so that the records can be easily read and accurately scaled.

The record-sheet length of travel for a given period of time—say an hour—determines the frequency with which the speed of the vehicle may be recorded, or, in other words, the smallness of the travel unit of record which may be adopted, the greater the movement of a record-sheet in a given time, however, the less the total time that can be covered by a single record-sheet of given dimensions. In the present instance the record-surface of the sheet or card is shown as twelve inches in length and three inches in width, so that a record-surface of about twelve inches long and three inches wide may be obtained.

In practice the record-sheet 2 may have its time divisions printed in red on thin strong paper and have at one end a gummed flap 3 (see Figs. 26 and 27) projecting beyond the end of the sheet, such sheet being provided with three holes 4, 4', and 4", located one near each edge at one side of the sheet and a third located near one edge at the other side of the sheet. In the form of sheet shown it is given twenty-four lengthwise spaces 5, formed by lengthwise lines 5', which are shown inclined, so that when the sheet is placed on its carrying-drum these lengthwise spaces will form a continuous helical path 5" around the drum, and in which helical path the event-records are printed or recorded. The sheet is also provided with crosswise time divisions 6, separated by distances determined by the time occupied by one rotation of the drum.

If the record-sheet is to constitute a seven days' record of twelve hours each, a sheet would be ruled with sufficient heavy crosswise lines to form twelve spaces at equal distances apart, each representing one hour of time, and each of which crosswise spaces would be again divided into a series of twenty-four smaller spaces, each representing two and one-half minutes of time. The first lengthwise space on the sheet would be printed, for instance, "Sunday, March 5, 1899, A. M.," the next lengthwise space being marked simply "P. M." for the same day, the third lengthwise space being marked "Monday, March 6, 1899, A. M.," the next lengthwise space being simply marked "P.M." for the same day, and then in the succeeding spaces, in the manner just indicated, "Tuesday," "Wednesday," "Thursday," "Friday," and "Saturday" "A.M." and "P.M.," thus completing the week of time on the record-sheet. The sheet being twelve inches in length and its carrying-drum making one turn in twelve hours would give, of course, one inch of travel for each hour of time and one-twelfth of an inch for each five minutes of time and one twenty-fourth of an inch for each two and one-half minutes of time. This precludes the possibility of a legible record of much smaller travel units than a quarter of a mile of vehicle progress at a twelve-mile speed. The space therefore available for the mile-record is one-twelfth of an inch, and if this record is made in one-quarter-mile divisions the impressions made upon the sheet would only be one forty-eighth of an inch apart, and at a twenty-four-mile speed per hour the quarter-mile impressions would be only one ninety-sixth part of an inch from each other, which is as close or closer than can be distinctly read, even with the best of record-printing.

It is desirable that the speed-record impressions recording the progress of the vehicle should represent as short travel units as possible, and a record made once in a quarter of a mile while it would be sufficiently close to satisfy the requirements of the vehicle-driver on ordinary occasions would not be sufficiently close to be of particular value in case of accident. The weekly sheet or card just described has certain points of convenience and advantage, and it could readily be furnished in blocks of fifty-two cards giving the entire year of time printed with daily dates all ready for use; but it is extremely desirable that a much smaller division of a mile than quarters should be made. This can only be done by giving more length of record-space per time unit, and therefore the improved sheet 2 shown in the drawings, to the use of which the mechanism herein illustrated is adapted, is provided, as above set forth, and which is about twelve inches in length and about three inches in width and is provided with twenty-four lengthwise spaces 5, formed by inclined lengthwise lines 5', forming when the sheet is placed on its carrying-drum a helical path.

In the present instance the mile-printing wheel (see Fig. 20) carries thirty-two printing-faces, shown herein as lines, as hereinafter more fully described, which provides for twelve miles an hour, the drum making a complete rotation in this time by means of the time mechanism, and the record-sheet providing one inch of record-space for the mile, the marking of the one thirty-second of a mile speed in divisions one thirty-second of an inch apart, so that at a speed of twenty-four miles an hour the record-lines would be one sixty-fourth of an inch apart, legible and easily measured.

In practice the upper left-hand part of the first lengthwise division 5 of the sheet would not receive any portion of the event-record from the printing mechanism, and this part of the sheet may be graduated as shown and could be sheared off from the sheet without mutilating the record to enable the slip so sheared off to be used to scale the printed record made on the sheet, as will be readily understood.

In practice the card may be printed as indicated, so that when applied to its carrying-drum the top division, at the right-hand corner thereof, would read "Noon," while the middle division at the left would read "Midnight," the bottom division reading "Noon" again, the intermediate times being marked in heavy vertical line divisions 6, covering fifteen minutes' time on the card, with lighter intermediate vertical lines 7, forming five-minute spaces 7' on the card, so that the time of all records made on the card can be noted at a glance, thus avoiding all uncertainty as to correct reading.

In practice the card may be printed in a color different from that made by the recording mechanism—as, for instance, printed in red, as above stated—while the speed-recording mechanism could produce its record in black or of any other suitable color, while the alarm-recording mechanism could produce its record in blue or any other suitable color.

To place the sheet on the drum, hereinafter described, the gummed flap 3 is first moistened, and then the pin-holes 4 and 4' at this gummed end are placed on separate pins or projections 9, carried by the drum, (see Fig. 21,) the opposite end of the card being then passed around the drum until such ends meet, the pin-hole 4" therein registering with one of said pins 9, whereupon the free end of such sheet is pressed down on the moistened flap, which thereby retains it, and thus secures the same to the drum. The drum 10 is, as above stated, moved at a uniform rate of speed by suitable time mechanism 12, which time mechanism may in practice constitute any ordinary clock-movement, (see Fig. 9,) not necessary to be herein more particularly described, and of such size as to permit the desired size of drum, which for the twelve-inch record-sheet would be about three and thirteen-sixteenths inches in diameter, to rotate freely upon the clock-case or other guiding means with which the clock mechanism would be furnished. In the present instance the drum rotates upon the clock-case 13, (see Fig. 9,) fixedly secured to a part, as the rear wall $b$, of the recorder case or casing A, adapted to inclose the operating mechanisms. The work which this clock mechanism performs will not in any way interfere with its time-keeping performance, and consequently the dial 14 thereof may be in a position to be read either from the interior of a car when the recorder is used in connection with a street-railway car or by a motor-driver or passenger when used in connection with a motor-vehicle, and for this purpose the recorder case or casing A is provided with a glass-dial door 15, properly cased at its edges, and which door is shown hinged to the recorder-casing, so as to permit the door to be opened upwardly, one leaf of the hinge being provided with a projection 16, (see particularly Figs. 1, 2, and 14,) extending through a slot 17 in the casing-wall to coöperate with a locking-bolt, hereinafter described. Since in the present instance this drum rotates once an hour, it can be driven directly from the minute-hand shaft or post 18 of the clock, it being connected therewith in some suitable manner. In the present instance this drum 10, of a width adapted to properly carry a full-width record-sheet and provided with pins or projections 9 on its periphery for the holes 4, 4', and 4" of the record-sheet, is furnished at its front edge with means—such, for instance, as a plurality of arms 19—preferably connected at their inner ends by a web 20, having an opening 21, shown herein as angular, for the reception of the minute-hand post or shaft 18, which for this purpose is provided with an angular end 18', projecting beyond the minute-hand. It will be readily seen that the arms 19 may be connected to form a continuous head or web for the drum, if desired, and as this is an obvious equivalent to said arms such a construction is within the scope of the claims.

For positively maintaining the drum in operative connection with the minute-hand post and against movement thereon and to permit the same to be readily and quickly removed therefrom suitable means is provided, which in the present instance comprises a pair of spring-held members or clips 22, (see Fig. 21,) each of which is shown pivotally secured to one of the drum-arms and also shiftably connected with another of said arms by means of a pin 23 and slot 24, the slot in the present instance being formed in the clip, while the pin projects from the arm. Each clip is shown forked or bifurcated, whereby it incloses three sides of the angular end of the minute-hand shaft, one part of such clip being adapted to project into a groove or slot 25, formed in such angular end, and held in such position by a spring 26, having one end secured to said clip and its opposite end to the companion clip. (See particularly Figs. 1, 9, and 21.) Each of the clips is provided with a finger or thumb piece 27, whereby when it is desirable to remove the drum from the shaft this can be readily accomplished by merely drawing the finger-pieces toward each other, whereupon each clip will be swung on its pivot, so as to throw that part thereof which is in the groove or recess of the shaft free therefrom and against the action of its spring, whereby the drum may be readily removed from the shaft, the clips being limited in their swinging movement by the combined slot-and-pin connection above referred to. By means of these spring-clips it will be seen that the movement of the drum longitudinally of the shaft is positively prevented.

To insure the placing of the drum in the correct position each time on the hand-shaft, the web of the arms is shown provided with a projection or teat 20', adapted to engage a recess or groove 28, (see particularly Figs. 1 and 21,) formed in such post, whereby in order to permit the placing of the drum on the post such projection or teat 20' must register with the groove 28 in the shaft. On the manipulation of this double spring-clip by means of the finger-pieces the drum can be completely and instantly released from the clock mechanism and can be readily withdrawn from the recorder-case to permit the removal of the old record-sheet, which is accomplished by cutting at the line where the ends meet, whereupon a fresh record-sheet can be quickly and readily applied, after which the record-drum may be slipped back in place on the clock-case, whereupon the double spring-clip will automatically operate to secure the drum to the minute-hand post or shaft.

It is not necessary that the record-sheet should be changed on the drum at any specified time, since all that is necessary to secure another record for twenty-four hours on the sheet is to inscribe the sheet with the number of the day of the month in pencil at the time division of the sheet indicated by the clock when the new sheet is placed in the recorder, and since the drum can have but one position relatively to the minute-hand post, owing to the teat or projection 20' and its registering groove 28, it follows that no matter what time the new card is placed in the recorder it will always carry a full twenty-four hours' record. If the card is applied at twelve o'clock noon it will carry a record until twelve o'clock noon the next day, which will fill the card. By dating the card in pencil at the hour of its application the day upon which the record is made is thereby defined. To produce upon this card a record of the event which is to be recorded, suitable recording mechanism is provided. This recording mechanism in the form shown comprises two independent mechanisms, one for recording the speed of the vehicle and also the starting and stoppage thereof and the other for recording the use or operation of a warning signal or alarm, and in the present case the former will be designated as "speed-recording" mechanism, while the latter will be designated as "alarm-recording" mechanism, and while each may be entirely separate and distinct from the other not only in construction, but also as to the means for operating it, in the present instance, however, these independent recording mechanisms may be operated transversely of the record-sheet by the same means, and therefore the speed-recording mechanism has its supporting parts constructed to facilitate this organization. In the form shown (which may be its preferred form, if desired) the speed-recording mechanism (see Figs. 3, 4, 5, 11, and 12) comprises impression or printing mechanism and actuating mechanism. The impression mechanism in the present instance is carried by a suitable bracket or arm 30, with which such impression mechanism may be readily assembled before the bracket or arm is placed in the recorder-casing, whereby the assemblage of the parts is facilitated. This arm or bracket 30, which in practice may be a casting, is mounted for vibratory or oscillatory movement on a suitable rock-shaft 31, journaled in suitable uprights or supports 32 and 32', located one adjacent to the front wall $a$ and the other adjacent to the rear wall $b$ of the casing. When the impression mechanism is assembled for movement laterally or transversely of the record-sheet, it is necessary that this bracket and its rock-shaft be so constructed that on the actuation of the shaft the bracket will be vibrated, while at the same time such bracket may be shifted longitudinally of such shaft, and for this purpose the shaft is shown as a squared shaft, while the bracket is provided with a sleeve 30', having a squared socket, whereby the operation of the parts in the manner indicated is obtained. The impression mechanism comprises a suitable printing device, shown and designated herein as a "mile-printing wheel" 33, since one complete rotation thereof is equivalent to a mile of vehicle travel, and which in practice will be formed of hard steel and of any desired width. This wheel in the form shown (see Fig. 20) will be provided, as hereinbefore set forth, with thirty-two printing surfaces or teeth 34, of different lengths—that is to say, the lengths of the teeth crosswise of the wheel will be graduated in the usual manner of a graduation of thirty-two parts to a unit—and one of these teeth, as 35, will be slightly wider or thicker in cross-section than its companion teeth, whereby it will indicate the termination and commencement of each mile unmistakably. This printing-wheel 33 is carried by the vibratory bracket or arm, and for this purpose the arm is shown bifurcated at its forward end, intermediate the members 36 and 37 of which the mile-printing wheel is journaled. An ink-supply device—such, for instance, as a felt roller 38—is located in position to supply the mile-printing wheel 33 with ink, and in the structure shown it is also journaled intermediate the furcated members 36 and 37 of the bracket and above the mile-printing wheel, so as to contact therewith, whereby it rotates on the rotation of the printing-wheel, which latter is turned one thirty-second part of a rotation at each vibration of the bracket or arm 30, and for this purpose suitable ratchet mechanism is provided, shown comprising a ratchet-wheel 39, fixedly secured to the mile-printing wheel and journaled for rotation therewith on said mile-printing-wheel shaft. To operate this ratchet-wheel 39, a pawl 40 is supported in position by one member, as 36, of the bracket 30. In the present instance this pawl is provided with a contact-face 41 and is located in position so as to engage the inner side of the top wall c of the casing, it being provided with a slot 42 therein, working on a projection 43, carried by the arm 36 of said bracket, whereby the bracket is free to move upwardly independently of said pawl 40. This pawl is maintained in operative engagement with the teeth of the ratchet-wheel 39 by a spring 44, one end of which is connected with the upper portion of such pawl, while the opposite end thereof acts as a detent to prevent reverse motion of the ratchet-wheel, and for this purpose such spring is maintained in position in a slotted member 45 by means of a screw 46, said slotted member 45 being carried by the member 36 of the bracket 30.

From the foregoing it will be seen that in the present improvement each time the rock-shaft is actuated the record-impression arm or bracket will be vibrated thereby to carry the impression or mile-printing wheel into printing engagement with the record-sheet, such wheel being shifted one tooth each time such arm is vibrated, which shifting movement, however, takes place after the impression on the sheet and when the printing-wheel-carrying end of the bracket moves upwardly to carry said wheel away from the record-sheet. This movement of the bracket carries the ratchet-wheel 39 into such position relatively to its pawl, the upper part of which is in engagement with the casing-wall, that said pawl operates to shift the ratchet-wheel, and thereby the mile-printing wheel, one tooth.

Since in the present instance the record-sheet is twelve inches in length and the drum carrying the same makes one rotation in an hour and the mile-printing wheel is provided with thirty-two marking or printing surfaces, it follows that when the vehicle is moving at a speed of twelve miles an hour one inch of record-space is provided on the drum for each mile, so that the impression or mile-printing wheel at this speed will mark divisions one thirty-second of an inch apart, or at a speed of twenty-four miles an hour one sixty-fourth of an inch apart, as hereinbefore set forth. The actuating mechanism for this impression-wheel bracket comprises a lever 50, secured to the rock-shaft 31 and provided with a hard-metal shoe 51, maintained in engagement with a ratchet-wheel 52 by means of a spring 53, secured in position and shown fixed to one of the upright brackets, as 32. This ratchet-wheel 52, which may be designated herein as a "mile-wheel," since it makes one complete rotation to each mile, is provided with the same number of teeth as the mile-impression wheel 33, and therefore in the present instance it has thirty-two teeth and is shown herein secured to the hub 54 of a sixty-tooth worm-wheel 55, journaled in the present instance on a sleeve 56 of a depending bracket 57, formed as a part of a casting B, hereinafter referred to. This worm-wheel 55 is in mesh with a single-thread worm 58, journaled within a sleeve or casing 59, likewise formed as a part of said casting B, it being cut away to permit the proper meshing of such worm and worm-wheel. In the present instance this worm-actuated ratchet-wheel 52 is operated from a rotary part—as, for instance, from the wheel of a vehicle. In the case of a road-vehicle this motion may be taken from any wheel; but in the case of a street-railway car it is preferable that this motion should not be obtained from a driving-wheel, since a driving-wheel may slip and so turn without advancing the car. This ratchet-wheel 52, with its thirty-two teeth, must make one complete rotation or turn for each mile of vehicle travel. This is accomplished in the present organization by means of suitable transmitting mechanism (see Fig. 6) shown mounted on the above-mentioned casting B, which is secured to the outer side of one end of the recorder-casing. Part of this casting B extends interiorly of the recorder-case and forms the support and casing 59 for the worm journaled therein and also carries the bracket 57 for the worm-wheel 55. All of the parts supported by this casting may be assembled therewith before it is mounted on the casing, this being permitted by providing the casing-wall with an opening e, (see particularly Fig. 6,) communicating with and extending below the cover-opening f, whereby the casting B and its assembled mechanisms may be inserted through such cover-opening and secured in position in the manner set forth, the casting having a wall-section g, adapted to cover such opening e.

This transmitting mechanism is in practice in operative connection with a rotary member—as, for instance, the wheel of a vehicle or axle thereof—which part may be provided with a cam adapted to operate a connector or rod 60, the opposite end of which is in connection with a double-stroke bell-crank 61. In the form of connection shown (see Figs. 6 and 23) this rod 60 projects into a split sleeve 62 and is furnished with an annular groove 63, the sleeve being provided with an enlarged portion 64, having a depending bolt-carrying portion 65 for the reception of a bolt 66, which registers with the groove 63 of said rod, and thereby maintains the sleeve and rod in firm connection with each other. The upper part of this sleeve is provided with a threaded cap 67 to form an oil-chamber 68 for the reception of suitable oil-feeding material. The bell-crank 61 is loosely mounted upon the hub of a ratchet 69, hereinafter described, and has one arm 61' thereof bifurcated to receive the enlarged portion 64 of the sleeve 62, to which it is bolted, the opposite arm 61'' thereof carrying a pawl 70, maintained in engagement with the ratchet 69 by a suitable spring 71, carried by said bell-crank. This ratchet 69 is journaled on a bolt carried by the casting B and is provided with twelve teeth, it being actuated one tooth for each complete double stroke of the bell-crank. A suitable ratchet detent or pawl 72 is bolted to the casting, being maintained in working position by a spring 73, secured to said casting, and effective to prevent the reverse motion of such ratchet 69 on the working of the bell-crank. This bell-crank ratchet 69 actuates, by suitable intermediate gearing, the single-thread worm 58, and thereby the sixty-tooth worm-wheel 55, to rotate the worm-wheel ratchet 52, the passage of each tooth of which actuates the shoe of the depending lever 50, secured to the rock-shaft 31, vibrates the mile-printing-wheel arm or bracket, and thereby the mile-printing wheel, to print its mark or symbol on the record-sheet. By the provision of gear mechanism having the number of teeth just described it gives the thirty-two-tooth ratchet-wheel 52 one turn to seven hundred and twenty turns of the driving-wheel, which is substantially correct for a twenty-eight-inch driving-wheel. It is necessary that this thirty-two-tooth ratchet-wheel 52 should make, as nearly as possible, exactly one turn for each mile of vehicle travel, no matter what the diameter of the driving-wheel may be. The diameters of the wheels of street-railway cars, automobiles, and horse-drawn carriages vary from twenty-four inches in diameter upward, and therefore to give the thirty-two-tooth ratchet-wheel 52 the correct number of rotations for a driver of any diameter—as, for instance, between twenty-four and forty-eight inches— a twenty-eight-inch-tooth driving-gear 73' is secured to the outer end of the single-thread worm 58, and to which gear 73' motion is imparted from the twelve-tooth bell-crank ratchet 69 by means of a pair of gears 74 and 75, one, as 74, rigid with, but removable from, the hub of the ratchet 69, and the other, as 75, adjustably supported on the casting B, constituting an intermediate gear between such ratchet-gear 74 and said twenty-eight-tooth gear 73'. This gear 75 is secured to a sector-shaped arm 76, pivotally secured to said casting B, and provided with a slot 77, working on a bolt 78, secured to said casting, whereby this intermediate gear can mesh with variable gears having any number of teeth from twenty-four to forty-eight which it may be desired to mount upon the twelve-tooth ratchet-hub to be driven thereby.

The assemblage of the twelve-tooth ratchet 69 and the twenty-eight-tooth worm driving-gear 73', together with the sixty-tooth worm-wheel 55, constitute an inch of driving-wheel diameter, so that the introduction of a different gear on the hub of the ratchet 69, this gear having the same number of teeth that there are inches in diameter of the selected wheel of the vehicle will cause the thirty-two-tooth ratchet-wheel 52 to make one rotation to the mile of vehicle travel, regardless of what the selected wheel diameter may be.

In practice a ratchet-driven gear 74, having the desired number of teeth, may be fixed in place by the selling agent of the recorder for use when the same is supplied to the particular vehicle in connection with which it is to operate, such selling agent carrying in stock a complete assortment of changeable gears varying from each other by one tooth only, so that a change-gear suitable for any diameter of vehicle-wheel which it may be necessary to accommodate can be readily supplied, and to apply such change-gear to the twelve-tooth ratchet-hub it is merely necessary to slacken the bolt which projects through the slot 77 of the sector-arm 76, fix the selected gear in position, then move the sector-arm 76, with its intermediate pinion 75, until it meshes correctly with such ratchet-gear 74 and the twenty-eight-tooth worm driving-gear 73', and then secure such sector-arm in position by its bolt.

Supported by the casting B in the interior of the recorder-case A is a suitable buffer 80 (see Fig. 24) for the depending rock-shaft lever 50. In the form shown this buffer is spring-actuated and comprises a buffer-head 81, having a stem 82, encircled by a spring 83, located in a casing 84, formed as a part of said casting, and which spring engages at one end the wall of such casing and at its opposite end the inner face of such buffer-head. This buffer-head 81 is furnished with a recess 81' at one side, having an inclined face or wall 81''. Coöperating with this inclined face 81'' is an adjusting member 85, likewise having an inclined face 85' and guided by a part of such casting, the adjustment of such member being obtained by a suitable screw 86. By this construction the movement of the buffer is limited, while also it is adjustable to take up wear. The buffer acts to raise the impression or mile-printing wheel 33 from the record-sheet immediately after an impression has been made, and for this purpose it contacts with a member formed or secured to the lever 50.

In operation each tooth of the ratchet-wheel 52 acts in the nature of a cam-surface, so that as each tooth comes into engagement with the shoe 51 of the depending lever 50 it acts to shift said lever against its spring 53, and thereby move the rock-shaft 31, and consequently the mile-printing wheel, away from the record-sheet until such cam-surface passes out of engagement with such shoe, whereupon the spring 53 instantly forces the depending lever into the succeeding cam recess or space, and thereby sufficiently vibrates the mile-printing-wheel arm to force the printing-wheel 33 into engagement with the record-sheet to make an instantaneous impression on such sheet, this being permitted by the buffer which at this time receives the blow of such lever.

In some organizations of the present improvement the record-sheet may be so formed and supported that the shifting of the impression mechanism, and thereby the mile-printing wheel, laterally or transversely of such sheet may not be necessary, while in other forms thereof the record-sheet may be shifted, together with its drum, laterally or transversely of the impression mechanism, which may be fixed against lateral movement; but in the present organization, since it is more convenient to shift that mechanism which is of the least width, the impression mechanism is shown as shiftable laterally or transversely of the record-sheet simultaneously with the rotation of the sheet-carrying drum, whereby the necessity of shifting the impression mechanism at the end of each complete rotation of the record-sheet-carrying drum is avoided. Of course should it be found desirable to shift the impression mechanism laterally only at the end of each complete rotation of the drum it would not be necessary to provide the record-sheet with a helical path. Since in the present instance the impression mechanism is shifted laterally, so as to maintain the mile-printing wheel in a helical path throughout the entire width of the record-sheet, suitable mechanism for this purpose is provided, which in the present improvement (see Figs. 3, 4, and 5) comprises a single-turn screw-cam 90, the hub of which is journaled on a shaft or bolt 91, carried by a suitable bracket C, secured to one, as the rear wall of the casing, and which cam is provided with a worm-wheel 92, (shown having forty-eight teeth and designated herein as a "day-wheel,") since by the means about to be described it rotates the cam completely once in twenty-four hours. This day-wheel 92 is operated by the time mechanism and for this purpose is in connection with the minute-hand post of the timepiece. The minute-hand post 18 is shown extended, so as to project at the rear side of the timepiece-case, and is provided with a miter-gear 93, shown provided with twelve teeth, meshing with which is a similar miter-gear 94, mounted on a shaft 95, carrying a double-thread worm 96, in mesh with the forty-eight-tooth worm-wheel 92, said worm being mounted in a suitable casing forming part of the bracket C. Carried by the mile-printing-wheel arm or bracket 30 is a cam-engaging member 97, having an inclined face maintained in contact with the edge of the cam 90 by a suitable spring, hereinafter described. By this organization the screw-cam 90 is given in the present instance a single turn in twenty-four hours, whereby the printing-wheel will be shifted across the three-inch-width record-sheet once in each twenty-four hours. At the end of the twenty-four hours, the mile-printing wheel having made a complete record for that period on the record-sheet, it is shifted back into its starting position, this being accomplished by forming the cam 90 with a straight surface or edge 90', located in parallelism with the axis of such cam, whereby when the cam has made a complete turn the cam-engaging member 97 is free of the cam-edge 90'', so that the mile-wheel arm or bracket may be shifted into its starting position by means provided for the purpose, which in the present instance comprises spring-actuated means in the form of a lever 98, pivoted adjacent to the lower wall $d$ of the casing and in the present instance to a cross member 32'', connecting the uprights or standards 32 and 32', carrying the rock-shaft 31. The upper end of this lever 98 is provided with a friction-roll 98', in permanent engagement with the arm or bracket 30. A spring 99 has one end thereof secured to an arm 98'', projecting from the lower end of said lever 98, and its opposite end to a projection 32''', formed on the upright or standard 32', such spring being maintained in position by a pair of projections or guides 100 and 100', one at each side edge of such spring. By this construction the arm or bracket 30 is constantly under spring tension, so that when the curved edge 90'' of the cam 90 has shifted such mile-printing-wheel arm or bracket completely across the record-sheet and is no longer effective to shift such arm or bracket the spring-actuated lever instantly returns such arm to its starting position.

It will be understood, of course, that the day-wheel 92 may have any desired number of teeth and that the organization may be such that the cam 90 will shift the mile-printing-wheel arm or bracket 30 transversely of the record-sheet during a period only of twelve hours instead of forty-eight hours, if desired, and that the arm or bracket 30 may be shifted in various other ways and may be engaged and released from the cam in a great number of different ways, if desired.

From the foregoing it will be seen that a record-sheet twelve inches in length and three inches in width and having a continuous helical path will make a complete turn in an hour, and consequently twenty-four turns in a day, during which period of twenty-four hours the mile-printing wheel traverses entirely across such record-sheet, moving simultaneously with the rotary movement of the sheet, so that by the provision of a helical path on such sheet a complete continuous record can be made for a period of twenty-four hours without the necessity of intermittently shifting the printing-wheel each time the drum makes a complete turn.

As hereinbefore stated, the present improvement not only provides means for furnishing an accurate record of the speed of a vehicle, but also an accurate record of the sounding of an alarm—such, for instance, as a bell or gong. This alarm-record is obtained by the provision of an impression mechanism (see Figs. 3, 4, 5, 11, and 12) which while entirely independent of the speed-recording mechanism is nevertheless in the present organization so located that the same means which shifts the speed-recording mechanism transversely of the record-sheet also shifts the alarm-recording mechanism therewith. In the present organization this alarm-recording mechanism makes its record on the record-sheet at a certain predetermined distance or time interval (shown herein as two minutes) in advance of the actual time of the sounding of the alarm; but this mislocation of the alarm-record on the record-sheet does not impair the accuracy of the record, since this record is placed on the sheet always precisely two minutes in advance of its correct location. In the case of an accident (which is the only occasion in which an alarm-record becomes a matter of serious importance) it is better that this record should be thus located in advance of its proper position, since it is thereby placed on an otherwise unimprinted portion of the sheet.

In practice, as hereinbefore stated, the record-sheet may be printed in red, thus permitting the speed-record to be printed in black and the alarm-record in blue, so that even though the speed-record is subsequently printed directly over the alarm-record nevertheless the different colors of the inks used will obviate any difficulty in distinguishing one from the other. Moreover, in the present instance (see Fig. 19) the marks or symbols $x$ of the speed-record extend straight across the helical path on the record-sheet, while the marks or symbols $y$ of the alarm-record are printed at an angle—as, for instance, at an angle of forty-five degrees—to said speed-record marks $x$, and therefore not only because of the difference in the colors of the inks, but also because of the difference in the directions of the record-marks, one cannot possibly be mistaken for the other. When the alarm is sounded rapidly, as is likely to be the case in an emergency, the bell-record impressions will be made so close together as to present the appearance of a lozenge or diamond shaped impression, which, however, owing to the color of the ink, would not render unreadable the speed-impression record should the vehicle advance during the next succeeding two minutes in time. In the present form shown, and which may be its preferred form, if desired, this alarm-impression mechanism is mounted on a rock-shaft 101, supported by the front and rear walls of the casing, and which rock-shaft is shown as a squared shaft whereby the alarm-impression mechanism may be vibrated and at the same time laterally shiftable thereon with the speed-recording mechanism, as above set forth. This alarm-recording mechanism (see particularly Figs. 11 and 12 and also Fig. 5) comprises a suitable printing device, shown herein, comprehending a printing-wheel 102, having a series of printing faces or teeth and carried intermediate the members 103' and 103" of a forked bracket 103, pivotally supported for swinging movement intermediate the members 104' and 104" of one arm 104 of a bell-crank 105, mounted on said rock-shaft 101, the hub or sleeve 106 of which bell-crank has a squared socket for the reception of such shaft. This forked bracket 103 is provided at each side thereof with a projection or stud 107, working in an inclined way or groove 108, formed in the inner face of each of the members 36 and 37 of the bifurcated mile-printing-wheel arm or bracket 30, whereby when the shaft 101 is rocked the printing-wheel 102 travels downwardly, being properly guided into position by said ways to print on the record-sheet. The inking means for this printing-wheel may comprise a felt pad 109, secured to the other arm 105' of the bell-crank 105, the construction being such that when the bell-crank is oscillated the inking-pad will be moved out of the way of the alarm-recording wheel during the travel of such wheel toward the record-sheet, thereby to prevent the sliding of the printing-faces thereof on such pad, which would result in the blurring of the record during the printing thereof. On the return of the rock-shaft to its normal position the ink-pad is swung toward the printing-wheel, which as it is moved upward by the bell-crank is guided by the grooves 108 and is carried into position to engage such pad. To insure the proper inking of the printing-wheel, means is provided for rotating the same and for bringing the proper printing-face of the wheel into position to contact with the record-sheet. This means in the present instance comprises a gear or toothed wheel 110, carried intermediate the members of the bifurcated bracket 103 and above the printing-wheel, it being in mesh therewith, whereby when the bell-crank 105 is actuated, which takes place each time the alarm is sounded, the printing-wheel will travel downwardly, as above set forth, during which the gear 110 will automatically rotate said printing-wheel to bring one of its marking-faces into contact with the record-sheet, which marking-faces, as above set forth, comprise inclined lines $y$, one carried by each tooth of the wheel.

When the recorder is constructed for use with an automobile, the alarm may be connected directly therewith and may be in the nature of a bell or gong 112, supported by the casing of the recorder, and the clapper 113 thereof may be spring-controlled and have its actuating-arm 114 mounted on one end of the rock-shaft 101, suitable means, if preferred, being connected with such arm for operating it. On the ringing of the bell the rock-shaft would be actuated to shift the printing-wheel into contact with the record-sheet, the spring 113' of the clapper returning such rock-shaft 101, and thereby the printing-wheel, to its normal position. When, however, the recorder is used in connection with a street-railway car, the ordinary gong may be used, if desired, it being connected in some suitable manner with the alarm-recording mechanism.

Since a portion of the alarm-recording mechanism is located intermediate the members of the bifurcated mile-printing-wheel arm or bracket 30, it follows that the alarm-recording mechanism will be shifted simultaneously with the speed-recording mechanism across the face of the record-sheet by the same means that shifts the mile-recording mechanism, although other means could be used for this purpose were it deemed necessary. It will be understood from the foregoing that this traverse of the speed-recording mechanism and the alarm-recording mechanism, which is given by the twenty-four-hour spiral cam actuated from the time mechanism, taken together with the rotation in clock-time of the drum, which carries the record-sheet, make it impossible that the speed and alarm record mechanisms should be printed on the sheet otherwise than in the proper time location, it not being within the power of the driver of the vehicle to change the location of any event record on the sheet. All that the driver can do is to prevent the mechanism from acting, and thus produce a blank record, which would indicate either that the mechanism had been tampered with or that the vehicle was not moving during such period. When the vehicle is stationary, the timepiece, however, continues to rotate the drum and the record-sheet carried thereby, so that it follows that the period during which such vehicle remains stationary and the time when it stopped and started can be readily ascertained with reasonable degree of certainty by an inspection of the record-sheet, which will show a blank space intermediate the time the vehicle stopped and started, the length of such space indicating immediately the length of time the vehicle was stationary and the time it started and stopped, and since it is the usual requirement with street-railway roads that a gong be sounded on the starting of the car it follows that the record-sheet will also indicate whether this work was performed or not.

When the recorder is constructed for use in connection with street-railway cars, it is desirable to have a trip-record—that is, a record of each trip of the car during the day, especially if the same company has cars running to different localities. For instance, in Brooklyn, New York, the cars of one line may run from Fulton Ferry, the City Hall, and the New York end of the bridge to Prospect Park, Vernon avenue, Vanderveer Park, Bergen Beach, &c., and besides these trips they make what are called "barn trips," which carry no passengers. Hence in order to make a record not only as to the speed of the car and the time of the sounding of the alarm, but also of the route the car was running on at the time such record was made, an improved trip-recording mechanism is provided, (see Fig. 12,) and for this purpose the printing-wheel 102, instead of having the ordinary inclined marks $y$, which is quite sufficient in case of a road-vehicle, is provided with a series of raised trip-index letters $z$, (see Fig. 18,) one located on each tooth thereof. Any one of these letters may be brought into printing position by turning an indicator 115, located on an index-dial 116, (see Fig. 1,) having corresponding letters $z'$, and which dial is secured in position at the outer side of the recorder-case A, whereby the indicator is accessible to the motorman or conductor, who is thus enabled to manipulate such indicator so as to bring the proper trip-letter on the recording-wheel into position to print on the record-sheet, and for this purpose the index-dial is provided with a series of holes 116', one located adjacent to each letter $z'$, for the reception of a pin 115', carried by the indicator, whereby said indicator may be locked in the desired position by the insertion of such pin into the proper hole. Fixedly secured to this indicator is a spur-gear 117, which meshes with a similar gear 118, mounted on the end of a shaft 119, (see Figs. 2 and 11,) supported in parallelism with the rock-shaft 101. This shaft 119 is provided with a longitudinal groove 120, and splined thereto at its opposite end for rotary movement therewith is a gear 121, in mesh with a gear 122, loosely mounted on a suitably-formed part of the rock-shaft 101, which loose gear is in mesh with a gear 123, fixed to the shaft of the printing-wheel-actuating gear 110, whereby it will be seen that on the turning of the indicator 115 the transmitting-gears will rotate the alarm-printing wheel into position to bring the letter corresponding to that on the dial contiguous to which the indicator has been shifted into position to print on the record-sheet. The organization is such that this transmitting-gear mechanism moves with the alarm-bell crank 105 when the same is shifted transversely of the record-sheet, the splined and rock-shaft gears 121 and 122, respectively, being supported intermediate one side of said bell-crank 105 and one of the members of the mile-printing-wheel arm 30, and maintained in such position by a suitable plate 125, bolted to such bell-crank.

In use, presuming that the dial is provided, for instance, with the letters "F," denoting a trip to Fulton Ferry; "B," denoting a trip to the bridge; "P," denoting a trip to Prospect Park; "V," denoting a trip to Vernon avenue; "S," denoting a trip to the sea—for instance, Bergen Beach—"J," denoting a trip to Vanderveer Park Junction; "H," denoting a trip to City Hall, and "O," denoting a barn trip carrying no passengers, the alarm-printing wheel having similar letters when the indicator is turned, for instance, to the letter "B," denoting a trip to the bridge, said printing-wheel is likewise rotated by means of the transmitting-gears to bring the letter "B" into position to contact with the record-sheet when the alarm is sounded. The indicator having been turned into the desired position, it is locked therein, as above set forth, so that at each time the alarm is sounded from the commencement of the trip to the termination thereof the same index-letter will be printed upon the record-sheet, thus denoting not only when the trip commenced and ended, but the particular trip being made, during which the speed of the vehicle is recorded, so that this trip-recording mechanism, combined with the speed-recording mechanism and the alarm-recording mechanism, indicates fully the work of the car during such trip. At the end of the trip the motorman or conductor will merely shift the indicator to bring the proper letter denoting the return trip into position to print on the record-sheet. The starter at the barn of course keeps a record of the names or numbers of the conductors or motormen assigned to each car, and this starter's list, together with the recording-sheet, gives a complete record of each trip of a car, the speed thereof, and the sounding of the alarm and the time at which each of these events occurred for the entire day, so that should an accident happen it will be known with certainty whether the alarm was properly sounded and whether or not the car was running beyond the speed allowed by law.

When the recorder is constructed for use in connection with road-vehicles or even when constructed for use in connection with street-railway cars, where it is desired to record the number of miles traveled per day, it is desirable to have a cyclometer for this purpose. This is especially valuable to liverymen, since they will thus know the number of miles traveled, as well as the speed at which the horse was driven, and the knowledge of the fact on the part of the hirer of the vehicle that a printed record is being produced of his treatment of the horse would in most cases cause him to use the animal with more care than if this record was not made, and since the recorder is provided with a mile-wheel it is a comparatively simple matter to provide it with a cyclometer. In the present instance a cyclometer (see Figs. 3 and 7) reading up without change to within one of a million miles of the possible total travel of the vehicle is furnished, this being obtained by providing a series of seven register-wheels $m$, $n$, $o$, $p$, $q$, $r$, and $s$, each loosely mounted on a shaft 131, supported by the sleeve 56 of the bracket 57, carried by the casting B. Fixedly secured to this shaft is a series of depending arms 133, one located intermediate each pair of register-wheels. To each of these arms is secured a spring-actuated pawl 134. (See Figs. 5, 7, and 8.) Each register-wheel except the first has its hub formed as a ten-tooth ratchet 135, in engagement with which is one of the pawls 134, located on the right side of such register-wheel. Each of these pawls has a part 136 in position to be engaged by a projection 137, carried by each register-wheel rim at the left side of such wheel. Motion is imparted to the register-wheels from the worm-wheel 55, and for this purpose such worm-wheel is shown provided at one side with gear-teeth 138. The first register-wheel of the series is likewise provided with gear-teeth 139 at one side, corresponding in number with the gear-teeth 138, formed at the side of the worm-wheel. In mesh with gear-teeth 138 and 139 is a pinion 140, secured to the casting B. Each time the worm-wheel 55 makes a complete rotation, which occurs once for each mile of vehicle travel, the register-wheel $m$ likewise makes a complete rotation, and thus actuates by means of its projection and pawl the register-wheel $n$ one tooth of its ratchet, thereby to indicate a mile of vehicle travel. When such register-wheel $n$ has made a complete rotation and has its "0" in reading position, the vehicle having traveled ten miles, such wheel $n$ has actuated the register-wheel $o$ one tooth of its ratchet, thereby bringing the figure "1" into alinement with the "0" of the wheel $n$ and indicating such ten miles of vehicle travel, and when all of the register-wheels have made a complete rotation the register will indicate nine hundred and ninety-nine thousand nine hundred and ninety-nine miles of vehicle travel, or within one of a million miles.

As hereinbefore stated, the recording mechanisms are preferably completely inclosed within a suitable casing A, which in the present instance is provided with three glass doors—the dial-door 15, located at the front thereof to expose the clock-dial, as hereinbefore described, and two doors 145 and 150, located at the top, one adjacent to each end of the casing, and one, as 145, in position to expose the cyclometer and the other, as 150, in position to expose the record-sheet after it has been printed upon. By the provision of these glass doors the various mechanisms can be readily inspected, and when the same are open such mechanisms can be adjusted, should this be necessary, the opening of the dial-door permitting the withdrawal of the record-sheet drum in the manner hereinbefore set forth. All of the doors may be locked closed to prevent tampering with the mechanisms and each may be locked, if desired, by a separate lock; but in the present construction all of the doors are locked by one lock, thus facilitating the use of the recorder. For this purpose the recorder-case is shown provided at the top *c* thereof (see Figs. 2 and 13) with a lock-case 151, in which is located this improved triple lock 152, a removable plate 151' completely inclosing the locking mechanism. The doors 145 and 150 are suitably hinged to the casing by pintles 145' and 150', each projecting through a pair of suitable hinge-plates, one plate of each door being provided with a projection 145" and 150", respectively, under which the locking-bolts are adapted to be shifted. Each door is locked by a separate and independent bolt, and therefore three bolts 155, 156, and 157, as shown, all operated by the same key, and for this purpose the lock-case 151 carries two of said bolts, as 155 and 156, having plates 155' and 156' working in said case, the bolts thereof projecting through the side walls of such case and into position to lock the doors 145 and 150 closed. The bolt-plates 155' and 156' are provided with key-engaging faces 155" and 156", whereby the bolts may be shifted simultaneously. To prevent the shifting of the bolts prematurely and to maintain said bolts in their locked positions, a spring-actuated tumbler 160 is located in the lock-case and is furnished with a pair of inclined faces 161 and 162, adapted to engage similar inclined faces 163 and 164, formed on the bolts. This tumbler works by means of a pair of slots 165 on a pair of projections 166, located in the lock-case, a spring 167 normally maintaining such tumbler in engagement with the bolts. The locking-bolt 157 for the dial-door is provided with a catch 171, adapted to engage the projection 16, hereinbefore described. This bolt 157 is provided with a pair of slots 172, working on a pair of projections 173, carried on the inner side of the casing-front *a*, one end of such bolt having a laterally-extending member 173', provided with an upright projection 174, passing into a slot 175 of the bolt-plate 156', whereupon when the key 180, which is provided with a pair of oppositely-disposed wings 181, is inserted in the keyhole 182 it first engages and actuates on a quarter-turn thereof the spring-actuated tumbler 160, to shift the same out its engaging position with the bolts 155 and 156, whereupon on the further turning of such key it engages the key-faces 155" and 156" of the bolt-plates 155' and 156' and withdraws both of the bolts 155 and 156 from their locking positions, simultaneously with which the dial-plate bolt 157 is moved by the bolt-plate 155' to release the projection 16 of the dial-door, and thereby permit the dial-door 15 to be opened. The locking mechanism herein shown is such as to permit the key to have only the proper part of a turn, the key being firmly held in its unlocking position when all the doors are free, it not being possible to remove the key without first closing and locking all of the doors. By the provision of this locking means not only are the bolts forced into their proper locking positions by the spring, but such spring acts to keep the doors closed against rattling.

Since it is desirable that the recording mechanism be lifted away from the record-sheet prior to the removal of such sheet with its drum, the door 150 has one of its hinge-plates provided with a projection 185, (see Fig. 13,) adapted to engage on the opening of the door one part of an arm 186, loosely mounted on a bushing 187, carrying one end of the rock-shaft 101. One end of this arm 186 is in engagement with an arm 188, fixed to the rock-shaft 31, whereupon when the door 150 is thrown upwardly into its open position, where it will remain of itself, the rock-shaft 31 will be actuated to throw the recording mechanism away from the record-sheet, thereby to permit such sheet to be readily withdrawn without being blurred by the recording mechanism.

The recorder is provided with a complete oiling system formed by the use of felt oil-plugs 200 of sufficient capacity to lubricate the mechanism for a year with once oiling, each of such plugs being carried at those points where the parts are required to be supplied with oil.

All of the parts subject to much wear will in practice be made of tempered steel, and since the whole mechanism is extremely simple and easily constructed it can be produced comparatively cheap, while exceedingly reliable and durable in action.

By the provision of the castings 30 and B (see Fig. 22) it will be seen that the manufacture of the device is much simplified, since the operating mechanisms carried by such castings may be readily assembled therewith prior to the disposition thereof in the casing A.

For use with road-vehicles the recorder may be of the size shown in the drawings, (see Fig. 1,) in which the casing could be about eight inches long and five inches high; but when the recorder is to be used in connection with a street-railway car it may be advisable to use a much larger dial than that shown in the drawings, in which case the drum could be, for instance, double the size shown herein, whereupon the clock-dial would be about seven inches in diameter, which would permit it to be plainly read from any portion of the car. This of course would necessitate record-sheets double the length of those hereinbefore specified, and consequently would give two feet of registering-surface to the hour, so that the mile could be divided into at least one hundred parts, each 52.8 feet in length, which would be preferable for a street-railway car. This would give a rate unit of perhaps as small dimension as would be found desirable. With the dimensions specified the five-minute space would be two inches in length, so that the speed-record lines at a twenty-four-mile rate would be marked one-fiftieth of an inch apart, each line thus being equal to a travel of the vehicle over 52.8 feet. For the use with street-railway cars it is probable also that the record-sheet would require a somewhat different marking.

It is to be understood, of course, that the various details, including, among others, the means of supporting the various mechanisms and the form of the gears, may be more or less modified without departing from the general scope of the invention.

I claim as my invention—

1. In a recorder for vehicles, the combination of time mechanism; a record-sheet shifted by said time mechanism and provided with separate time-spaces denoting similar periods of time duration; event-impression-producing mechanism actuated on the occurrence of the event to produce on the record-sheet in the particular space corresponding to the time in which the event occurred a readable record of the happening of such event; and means connected with the time mechanism and actuated thereby for shifting the impression means continuously in one direction across the record-sheet during the production of the record.

2. In a recorder for vehicles, the combination of time mechanism; a record-sheet shifted by said time mechanism and provided with separate time-spaces denoting similar periods of time duration; event-impression-producing mechanism actuated on the occurrence of the event to produce on the record-sheet in the particular space corresponding to the time in which the event occurred a readable record of the happening of such event; means connected with the time mechanism and actuated thereby for shifting the impression means continuously in one direction across the record-sheet during the production of the record; and means for returning the impression means to its starting position after it has been completely shifted across said record-sheet.

3. In a recorder for vehicles, the combination of time mechanism; a record-sheet shifted by said time mechanism and provided with separate time-spaces denoting similar periods of time duration; speed-recording mechanism and alarm-recording mechanism, the former actuated on the travel of the vehicle, and the latter actuated on the sounding of the alarm, each to produce on the record-sheet in the time-spaces thereof in separated and distinct parallel marks a record of the speed of the vehicle and of the sounding of the alarm; and means for shifting both of said recording mechanisms in one direction simultaneously and continuously across the record-sheet during the production of the record.

4. In a recorder for vehicles, the combination of time mechanism; a record-sheet shifted by said time mechanism and provided with separate time-spaces denoting similar periods of time duration; speed-recording mechanism and alarm-recording mechanism, the former actuated on the travel of the vehicle, and the latter actuated on the sounding of the alarm, each to produce on the record-sheet in the time-spaces thereof in separated and distinct parallel marks a record of the speed of the vehicle and of the sounding of the alarm; means for shifting both of said recording mechanisms in one direction simultaneously and continuously across the record-sheet during the production of the record; and means for returning said recording mechanisms to their starting positions after a complete shifting thereof.

5. In a recorder for vehicles, the combination of time mechanism; a record-sheet shifted by said time mechanism and provided with separate time-spaces denoting similar periods of time duration; speed-recording mechanism actuated on the travel of the vehicle, and alarm-recording mechanism actuated on the sounding of the alarm; and means for shifting both of said mechanisms in one direction simultaneously and continuously across the record-sheet during the production of the record, the assemblage of the mechanisms being such that both produce a record in the same path of travel on the record-sheet, one at a point located at a predetermined time interval in advance of the record made by the other.

6. In a recorder for vehicles, the combination of a timepiece; a drum connected with the mechanism of and rotated by said timepiece and carrying a record-receiving surface; and an event-impression-producing mechanism embodying a movable member carrying a rotary impression device and actuated on the occurrence of the event to print on said surface a record of the happening of the event; and means for shifting one of said mechanisms continuously in one direction transversely of the other.

7. In a recorder for vehicles, the combination of time mechanism; a record-receiving instrumentality shifted by said time mechanism; event-impression-producing mechanism actuated on the occurrence of the event to print on said record-receiving instrumentality a record of the happening of such event; and means for shifting said event-impression mechanism transversely of the record-receiving instrumentality, and embodying a worm in operative connection with the time mechanism, and a worm-wheel in mesh with said worm.

8. In a recorder for vehicles, the combination of time mechanism; a record-sheet shifted by said time mechanism and provided with separate time-spaces denoting similar periods of time duration; event-impression-producing mechanism actuated on the occurrence of the event to print on the record-sheet in the particular space corresponding to the time in which the event occurred a readable record of the happening of such event; and means for shifting said impression-producing mechanism transversely of said record-sheet, and comprising a worm in operative connection with the time mechanism for rotation thereby, a worm-wheel in mesh with said worm, and a cam actuated by said worm-wheel.

9. In a recorder for vehicles, the combination of time mechanism; a record-receiving instrumentality shifted thereby; speed-recording mechanism actuated on the travel of the vehicle to record on said record-receiving instrumentality a record of the speed of such vehicle; and means for shifting said speed-recording means transversely of the record-receiving instrumentality, and comprising a worm in operative connection with the time mechanism for rotation thereby, a worm-wheel in mesh with said worm, and a cam actuated by said worm-wheel.

10. In a recorder for vehicles, the combination of time mechanism; a record-receiving instrumentality shifted thereby; an alarm-recording mechanism actuated on the sounding of the alarm to record on said record-receiving instrumentality a record of the sounding of such alarm; and means for shifting said alarm-recording mechanism transversely of said record-receiving instrumentality, and comprising a worm in operative connection with the time mechanism for rotation thereby, a worm-wheel in mesh with said worm, and a cam actuated by said worm-wheel.

11. In a recorder for vehicles, the combination of record-sheet mechanism comprising a record-sheet having separate time-spaces denoting similar periods of time duration, and a timepiece operative to shift said record-sheet; an event-impression-producing mechanism actuated on the occurrence of the event, and embodying a rotary impression device, and means for rotating it, to print on the record-sheet in the particular space corresponding to the time in which the event occurred a record of the happening of such event; and means in operative connection with and actuated by said timepiece for shifting said impression mechanism transversely of the record-sheet and continuously in one direction across such record-sheet during the production of the record.

12. In a recorder for vehicles, the combination of a timepiece-actuated record-sheet; speed-recording mechanism actuated during the travel of the vehicle to produce a readable record on said record-sheet; means for shifting continuously in one direction during the production of the record one of said instrumentalities transversely of the other; and means for automatically returning said shifted instrumentality to its starting position after each complete shifting thereof.

13. In a recorder for vehicles, the combination of a timepiece; a record-sheet shifted by said timepiece and provided with separate time-spaces denoting similar periods of time duration; an alarm-recording mechanism actuated on the sounding of the alarm to produce on the record-sheet in a time-space thereof a record of the sounding of such alarm; means in operative connection with and actuated by said timepiece for shifting said alarm-recording mechanism transversely of said record-sheet and continuously in one direction across said sheet during the production of the record; and means for returning said alarm-recording mechanism to its starting position.

14. In a recorder, the combination of record-sheet mechanism comprising a record-sheet having separate time-spaces denoting similar periods of time duration, and a timepiece operative to shift such record-sheet; impression-producing mechanism comprising speed-recording means actuated on the travel of the vehicle, and alarm-recording means actuated on the sounding of the alarm, one to print on the record-sheet in the particular space corresponding to the time when such record was taken, and the other to print on the record-sheet at a point located at a predetermined time interval in advance thereof, marks, symbols or characters, thereby to indicate the speed of the vehicle and the sounding of the alarm; means operatively connected with and actuated by said timepiece for shifting said impression mechanism transversely of said record-sheet and means for automatically returning said impression mechanism to its starting position.

15. In a recorder, the combination of record-sheet mechanism comprising a timepiece, and a drum rotated thereby and carrying a record-sheet having inclined lines forming a helical path provided with separate time-spaces denoting similar periods of time duration; impression-producing mechanism comprising speed-recording means actuated on the travel of the vehicle, and alarm-recording means actuated on the sounding of an alarm, the former to print on the record-sheet in the particular space corresponding to the time when such record was taken, and the latter to print on the record-sheet at a point located at a predetermined time interval in advance thereof, marks, symbols or characters, thereby to indicate the speed of the vehicle and the sounding of the alarm; and means in operative connection with and actuated by said timepiece for continuously shifting the impression-producing mechanism transversely of said record-sheet during the rotation thereof.

16. In a recorder for vehicles, the combination of record-sheet mechanism comprising time mechanism and a shiftable record-sheet; an event-impression-producing mechanism actuated on the occurrence of the event to print on the record-sheet a readable record of the happening of such event; means for shifting one of said mechanisms transversely of the other and continuously in one direction during the production of the record; and spring-actuated means for returning said shifted mechanism to its starting position.

17. In a recorder, the combination of record-sheet mechanism comprising a timepiece and a drum mounted on the hand-post thereof for rotation therewith, and carrying a record-sheet provided with separate time-spaces denoting similar periods of time duration; speed-recording mechanism actuated on the travel of the vehicle, to print marks, symbols or characters on the record-sheet in the particular space corresponding to the time when such record was taken, thereby to indicate the speed of the vehicle; and alarm-recording mechanism actuated on the sounding of the alarm, likewise to print marks, symbols or characters on the record-sheet, thereby to indicate the sounding of the alarm.

18. In a recorder, the combination of record-sheet mechanism comprising a timepiece, and a drum connected with a hand-post thereof for rotation therewith, and carrying a record-sheet provided with separate time-spaces denoting similar periods of time duration; speed-recording mechanism actuated on the travel of the vehicle, to print marks, symbols or characters on the record-sheet in the particular space corresponding to the time when such record was taken, thereby to indicate the speed of the vehicle; alarm-recording mechanism actuated on the sounding of the alarm, likewise to print marks, symbols or characters on the record-sheet, thereby to indicate the sounding of the alarm; and means in operative connection with and actuated by the hand-post to which said drum is connected, to shift said recording mechanism transversely of said record-sheet.

19. Record-sheet mechanism comprising a timepiece; a drum connected by spring mechanism with the hand-post thereof; and a record-sheet secured to and rotatable with said drum.

20. Record-sheet mechanism comprising a timepiece provided with a dial and a hand post or shaft having a groove and carrying a hand, a drum provided with arms terminating at their inner ends in a web, having an opening for the reception of said hand-post, spring-controlled clips carried by said web, and having parts thereof projecting into said groove for removably maintaining said drum in position on said post, and a record-sheet removably carried by said drum, and having separate time-spaces denoting similar periods of time duration.

21. A record-carrying drum adapted to be secured to a rotary member; and shiftable spring-controlled means carried by said drum for engaging said rotary member thereby to removably secure the drum thereon.

22. Record mechanism comprising a timepiece having a dial and a hand post or shaft having an angular end and carrying a hand, a drum encircling said timepiece, and provided with arms terminating at the center thereof in a web having an angular opening for the reception of the angular end of said shaft, and spring-clips for maintaining said drum in position on said hand-post.

23. Record mechanism comprising a timepiece provided with a dial and a hand post or shaft, having a groove and carrying a hand, a record-sheet-carrying drum provided with arms terminating at their inner ends in a web, having an opening for the reception of said post, and spring-controlled clips carried by said web, and having parts thereof projecting into said groove for removably maintaining the drum in position on said hand-post.

24. A record-sheet-carrying-drum provided at one edge thereof with arms terminating at their inner ends in an opening and a pair of drum-holding clips shiftably supported on said arms.

25. A record-sheet-carrying drum provided with arms terminating at their inner ends in a web having an opening, and a pair of spring-controlled clips shiftably supported on said arms.

26. A record-sheet-carrying drum provided with arms terminating at their inner ends in a web having an opening, a pair of spring-controlled clips pivotally secured to said arms for shiftable movement, and means for limiting the movement of said clips.

27. A record-sheet-carrying drum provided with projections on its periphery and having arms terminating at their inner ends in a web provided with an opening, and a pair of spring-controlled clips shiftably supported on said arms.

28. Record-sheet means comprising a drum provided with one or more projections on its periphery and having arms terminating at their inner ends in a web provided with an opening, clips secured to said arms for shiftable movement, and a removable record-sheet provided with one or more openings registering with said projection or projections.

29. Record-sheet means comprising a drum provided with projections on its periphery and having arms terminating at their inner ends in a web provided with an opening, a pair of spring-controlled clips shiftably supported on said arms, and a removable record-sheet provided with openings adapted to register with the projections of said drum.

30. Record-sheet means comprising a drum provided with projections on its periphery and having arms terminating at their inner ends in a web provided with an opening, clips secured to said arms for shiftable movement, and a record-sheet provided with a helical path having separate time-spaces denoting similar periods of time duration, and also having openings registering with the projections on said drum.

31. Record mechanism comprising a timepiece having a dial and a hand-post carrying a hand; a record-sheet carrying a drum having means for locating a record-sheet in position and provided with spring-controlled means for removably connecting said drum to said hand-post; and means carried by said post and drum for locating said drum in position on said post.

32. In a recorder for vehicles, the combination of record-sheet mechanism embodying a shiftable record-sheet adapted to be printed upon; and speed-recording mechanism comprising a vibratory arm carrying a printing-wheel, means for rotating said printing-wheel, means for inking the same, and means for vibrating said arm on the travel of the vehicle.

33. In a recorder for vehicles, the combination of record-sheet mechanism embodying a record-sheet adapted to be printed upon; and speed-recording mechanism comprising a movable arm carrying a printing-wheel having a series of graduated printing-faces, means for rotating said printing-wheel, means for inking the same, and means for actuating said arm on the travel of the vehicle.

34. In a recorder for vehicles, the combination of record-sheet mechanism embodying a record-sheet adapted to be printed upon; and speed-recording mechanism comprising a vibratory arm carrying a printing-wheel having a predetermined number of printing-faces to the mile, means for inking said printing-wheel, means comprising ratchet mechanism for rotating said printing-wheel, and means for vibrating said arm on the travel of the vehicle.

35. In a recorder for vehicles, the combination of record-sheet mechanism embodying a shiftable record-receiving instrumentality adapted to be printed upon; a speed-recording instrumentality comprising a vibratory arm carrying a printing-wheel, means for rotating said printing-wheel, means for inking the same, means for vibrating said arm on the travel of the vehicle, and means for shifting one of said instrumentalities transversely of the other; and spring-actuated means for returning said shifted instrumentality to its starting position.

36. In a recorder for vehicles, the combination of record-sheet mechanism embodying a shiftable record-sheet adapted to be printed upon; and speed-recording mechanism comprising a movable arm carrying a printing-wheel having a series of graduated printing-faces, means for rotating said printing-wheel, means for inking the same, means for moving said arm on the travel of the vehicle, and means for shifting said speed-recording mechanism transversely of the record-sheet.

37. In a recorder for vehicles, the combination of record-sheet mechanism embodying a record-sheet adapted to be printed upon; and speed-recording mechanism comprising a vibratory arm carrying a printing-wheel having a predetermined number of printing-faces to the mile, means for inking said printing-wheel, means comprising ratchet mechanism for rotating said printing-wheel, means for vibrating said arm on the travel of the vehicle, and means for shifting said speed-recording mechanism transversely of the record-sheet.

38. In a recorder for vehicles, the combination of record-sheet mechanism embodying a record-sheet adapted to be printed upon; and speed-recording mechanism comprising a vibratory arm carrying a printing-wheel having a predetermined number of graduated printing-faces to the mile, means for rotating said printing-wheel, means for inking the same, means for vibrating said arm on the travel of the vehicle, and means in operative connection with and actuated by said record-sheet mechanism for shifting said recording mechanism transversely of said record-sheet.

39. In a recorder for vehicles, the combination of record-sheet mechanism embodying a record-sheet adapted to be printed upon; and speed-recording mechanism comprising a vibratory arm carrying a printing-wheel, means for rotating said printing-wheel, means for vibrating said arm on the travel of the vehicle, and comprising a spring-controlled lever, a ratchet-wheel in engagement therewith, a worm-wheel and worm for rotating said ratchet-wheel, and transmitting mechanism actuated on the travel of the vehicle for rotating said worm.

40. In a recorder for vehicles, the combination of record-sheet mechanism embodying a record-sheet adapted to be printed upon; and speed-recording mechanism comprising a vibratory arm carrying a printing-wheel, means for rotating said printing-wheel, means for vibrating said arm on the travel of the vehicle, and comprising a spring-controlled lever, a ratchet-wheel in engagement therewith, a worm-wheel and worm for rotating said ratchet-wheel and transmitting mechanism actuated on the travel of the vehicle for rotating said worm, and means for shifting said recording mechanism transversely of said record-sheet.

41. In a recorder for vehicles, the combination of record-sheet mechanism embodying a shiftable record-sheet adapted to be printed upon; and speed-recording mechanism comprising a vibratory arm carrying a printing-wheel, means for rotating said printing-wheel, means for vibrating said arm on the travel of the vehicle, and comprising a spring-controlled lever, a ratchet-wheel in engagement therewith, a worm-wheel and worm for rotating said ratchet-wheel, and transmitting mechanism actuated on the travel of the vehicle for rotating said worm, and means in operative connection with and actuated by said record-sheet mechanism for shifting said recording mechanism transversely of said record-sheet.

42. In a recorder for vehicles, the combination of record-sheet mechanism embodying a shiftable record-sheet adapted to be printed upon; and speed-recording mechanism comprising a vibratory arm carrying a printing-wheel, means for rotating said printing-wheel, means for vibrating said arm on the travel of the vehicle and comprising a spring-controlled lever, a ratchet-wheel in engagement therewith, a worm-wheel and worm for rotating said ratchet-wheel, and transmitting mechanism actuated on the travel of the vehicle for rotating said worm, and means in operative connection with and actuated by said record-sheet mechanism for shifting said recording mechanism transversely of said record-sheet, and comprising a worm, a worm-wheel, and a screw-cam rotated by said worm-wheel.

43. In a recorder for vehicles, the combination of record-sheet mechanism embodying a shiftable record-sheet adapted to be printed upon, and speed-recording mechanism comprising a vibratory arm carrying a printing-wheel, means for rotating said printing-wheel, means for vibrating said arm on the travel of the vehicle, and comprising a spring-controlled lever, a ratchet-wheel in engagement therewith, a worm-wheel and worm for rotating said ratchet-wheel, and transmitting mechanism actuated on the travel of the vehicle for rotating said worm, and comprising a bell-crank, a ratchet actuated thereby, and gearing actuated by said ratchet to rotate said worm.

44. In a recorder for vehicles, the combination of record-sheet mechanism embodying a shiftable record-sheet adapted to be printed upon; and speed-recording mechanism comprising a vibratory arm carrying a printing-wheel, means for rotating said printing-wheel, means for vibrating said arm on the travel of the vehicle, and comprising a spring-controlled lever, a ratchet-wheel in engagement therewith, a worm-wheel and worm for rotating said ratchet-wheel, and transmitting mechanism actuated on the travel of the vehicle for rotating said worm, and comprising a bell-crank, a ratchet actuated therewith, a changeable gear connected with said ratchet, a gear rigid with said worm, and an adjustable intermediate gear between said worm and ratchet gears.

45. In a recorder for vehicles, the combination of record-sheet mechanism embodying a shiftable record-sheet adapted to be printed upon; and speed-recording mechanism comprising a vibratory arm carrying a printing-wheel, means for rotating said printing-wheel, means for vibrating said arm on the travel of the vehicle, and comprising a spring-controlled lever, a ratchet-wheel in engagement therewith, a worm-wheel and worm for rotating said ratchet-wheel, and transmitting mechanism actuated on the travel of the vehicle for rotating said worm, and comprising a bell-crank, a ratchet actuated thereby, a changeable gear connected with said ratchet, a gear rigid with said worm, and an adjustable intermediate gear between said worm and ratchet gears, and means for shifting said recording mechanism transversely of said record-sheet.

46. In a recorder for vehicles, the combination of record-sheet mechanism embodying a shiftable record-sheet adapted to be printed upon; and speed-recording mechanism comprising a vibratory arm carrying a printing-wheel, means for rotating said printing-wheel, means for vibrating said arm on the travel of the vehicle, and comprising a spring-controlled lever, a ratchet-wheel in engagement therewith, a worm-wheel and worm for rotating said ratchet-wheel, and transmitting mechanism actuated on the travel of the vehicle for rotating said worm, and comprising a bell-crank, a ratchet actuated thereby, a changeable gear connected with said ratchet, a gear rigid with said worm, and an adjustable intermediate gear between said worm and ratchet gears, and means in operative connection with and actuated by said record-sheet mechanism for shifting said speed-recording mechanism transversely of the record-sheet.

47. In a recorder for vehicles, the combination of record-sheet mechanism embodying a shiftable record-sheet adapted to be printed upon; and speed-recording mechanism comprising a vibratory arm carrying a printing-wheel, means for rotating said printing-wheel, means for inking said wheel, means for vibrating said arm on the travel of the vehicle, and comprising a spring-controlled lever, a ratchet-wheel in engagement therewith, a worm-wheel and worm for rotating said ratchet-wheel, and transmitting mechanism actuated on the travel of the vehicle for rotating said worm, and comprising a bell-crank, a ratchet rigid therewith, a changeable gear connected with said ratchet, a gear rigid with said worm, and an adjustable intermediate gear between said worm and ratchet gears, and means in operative connection with and actuated by said record-sheet mechanism for shifting said recording mechanism transversely of said record-sheet, and comprising a worm and worm-wheel and a screw-cam rotated by said worm-wheel.

48. In a recorder, the combination of a record-sheet mechanism embodying a record-sheet adapted to be printed upon; and speed-recording means comprising a vibratory arm carrying a printing-wheel having a predetermined number of printing-faces to the mile, and means for actuating said vibratory arm, and embodying a rotary member having a series of actuating-faces corresponding in number with the printing-faces on the printing-wheel.

49. In a recorder, the combination of record-sheet mechanism embodying a shiftable record-sheet adapted to be printed upon; and speed-recording means comprising a vibratory arm carrying a printing-wheel having a predetermined number of printing-faces to the mile, means for actuating said vibratory arm, and embodying a rotary member having a series of actuating-faces corresponding in number with the printing-faces on the printing-wheel, and means for shifting said speed-recording means transversely of said record-sheet.

50. In a recorder, the combination of record-sheet mechanism embodying a shiftable record-sheet adapted to be printed upon; and speed-recording means comprising a vibratory arm carrying a printing-wheel having a predetermined number of printing-faces to the mile, means for actuating said vibratory arm, and embodying a rotary member having a series of actuating-faces corresponding in number with the printing-faces on the printing-wheel, and means in operative connection with and actuated by said record-sheet mechanism for shifting said speed-recording means transversely of the record-sheet.

51. In a recorder, the combination of record-sheet mechanism embodying a shiftable record-sheet adapted to be printed upon; and speed-recording means comprising a vibratory arm carrying a printing-wheel having a predetermined number of printing-faces to the mile, means for actuating said vibratory arm, and embodying a rotary member having a series of actuating-faces corresponding in number with the printing-faces on the printing-wheel, and means for rotating said member, and embodying transmitting mechanism comprising a changeable gear, an adjustable gear, and a fixedly-secured gear, the organization being such that the printing-wheel is adapted to make the same number of printing impressions per mile regardless of the size of the vehicle-wheel by the use of a changeable gear adapted to the size of such wheel.

52. In a recorder, the combination of record-sheet mechanism embodying a record-sheet adapted to be printed upon; and speed-recording means embodying a printing device having a predetermined number of printing-faces to the mile, means for actuating said printing device, and embodying a rotary member having a series of faces corresponding in number with the printing-faces of the printing device, and means for rotating said member, and embodying a fixedly-secured gear having a predetermined number of teeth, a changeable gear having the same number of teeth that there are inches in diameter of the driving-wheel of the vehicle, and an adjustable intermediate gear.

53. In a recorder, the combination of record-sheet mechanism embodying a shiftable record-sheet adapted to be printed upon, and speed-recording means embodying a printing-wheel having a predetermined number of printing-faces to the mile, means for actuating said printing-wheel, and embodying a rotary member having a series of faces corresponding in number with the printing-faces of the printing-wheel, and means for rotating said member, and embodying a fixedly-secured gear having a predetermined number of teeth, a changeable gear having the same number of teeth that there are inches in diameter of the driving-wheel of the vehicle, and an adjustable intermediate gear, and means in operative connection with and actuated by the record-sheet mechanism for shifting the recording means transversely of said record-sheet.

54. In a recorder, the combination of record-sheet mechanism comprising a timepiece, a drum rotatable with one of the hands thereof and carrying a record-sheet having separate time-spaces denoting similar periods of time duration; and speed-recording means comprising a vibratory arm carrying a printing-wheel having a predetermined number of printing-faces to the mile, means for actuating said vibratory arm, and embodying a rotary member having a series of actuating-faces corresponding in number with the printing-faces on the printing-wheel.

55. In a recorder, the combination of record-sheet mechanism comprising a timepiece, a drum rotatable with one of the hands of said timepiece, and carrying a record-sheet provided with separate time-spaces denoting similar periods of time duration; and speed-recording means comprising a vibratory arm carrying a printing-wheel having a predetermined number of printing-faces to the mile, means for actuating said vibratory arm, and comprising a rock-shaft, a lever connected therewith, a ratchet-wheel for actuating said lever, and having a series of teeth corresponding in number with the printing-faces on the printing-wheel, a worm-wheel for rotating said ratchet-wheel, a worm in engagement with said wheel, and transmitting mechanism intermediate said worm and an actuating means on the vehicle.

56. In a recorder, the combination of record-sheet mechanism comprising a timepiece, a drum rotatable with one of the hands of said timepiece, and carrying a record-sheet provided with separate time-spaces denoting similar periods of time duration; and speed-recording means comprising a vibratory arm carrying a printing-wheel having a predetermined number of graduated printing-faces to the mile, ratchet mechanism for rotating said printing-wheel, means for inking said wheel, means for actuating said vibratory arm, and comprising a rock-shaft, a lever connected therewith, a ratchet-wheel for actuating said lever and having a series of teeth corresponding in number with the printing-faces on the printing-wheel, a worm-wheel for rotating said ratchet-wheel, a worm in engagement with said wheel, and transmitting mechanism intermediate said worm and an actuating means on the vehicle.

57. In a recorder, the combination of record-sheet mechanism comprising a timepiece, a drum rotatable with one of the hands of said timepiece, and carrying a record-sheet provided with separate time-spaces denoting similar periods of time duration; and speed-recording means comprising a vibratory arm carrying a printing-wheel having a predetermined number of printing-faces to the mile, means for actuating said vibratory arm, and comprising a rock-shaft, a lever connected therewith, a ratchet-wheel for actuating said lever and having a series of teeth corresponding in number with the printing-faces on the printing-wheel, a worm-wheel for rotating said ratchet-wheel, a worm in engagement with said wheel, transmitting mechanism intermediate said worm and an actuating means on the vehicle, and means for shifting said recording mechanism transversely of the record-sheet, and comprising a worm in operative connection with said timepiece, a worm-wheel, and a screw-cam rotated by said worm-wheel, and in operative connection with said vibratory arm.

58. In a recorder, the combination of record-sheet mechanism comprising a timepiece, a drum rotatable with one of the hands of said timepiece, and carrying a record-sheet provided with separate time-spaces denoting similar periods of time duration; and speed-recording means comprising a vibratory arm carrying a printing-wheel having a predetermined number of printing-faces to the mile, means for actuating said vibratory arm, and comprising a rock-shaft, a lever connected therewith, a ratchet-wheel for actuating said lever and having a series of teeth corresponding in number with the printing-faces on the printing-wheel, a worm-wheel for rotating said ratchet-wheel, a worm in engagement with said wheel, transmitting mechanism intermediate said worm and an actuating means on the vehicle, and means for shifting said recording mechanism transversely of the record-sheet, and comprising a worm in operative connection with said timepiece, a worm-wheel, a screw-cam rotated by said worm-wheel and in operative connection with said vibratory arm, and means for returning said vibratory arm to its starting position.

59. In a recorder, the combination of record-sheet mechanism comprising a timepiece, a drum rotatable with one of the hands of said timepiece, and carrying a record-sheet provided with separate time-spaces denoting similar periods of time duration; and speed-recording means comprising a vibratory arm carrying a printing-wheel having a predetermined number of printing-faces to the mile, means for actuating such vibratory arm, and comprising a rock-shaft, a lever connected therewith, a ratchet-wheel for actuating said lever and having a series of teeth corresponding in number with the printing-faces on the printing-wheel, a worm-wheel for rotating said ratchet-wheel, a worm in engagement with said wheel, and transmitting mechanism intermediate said worm and an actuating means on the vehicle, and embodying a bell-crank, a ratchet actuated thereby and having a predetermined number of teeth, a changeable gear rotated by said ratchet, a gear having a predetermined number of teeth secured to said worm, and an adjustably-supported gear intermediate said ratchet-gear and said worm-gear.

60. In a recorder, the combination of record-sheet mechanism comprising a timepiece, a drum rotatable with one of the hands of said timepiece, and carrying a record-sheet provided with separate time-spaces denoting similar periods of time duration; and speed-recording means comprising a vibratory arm carrying a printing-wheel having a predetermined number of printing-faces to the mile, means for actuating such vibratory arm, and comprising a rock-shaft, a lever connected therewith, a ratchet-wheel for actuating said lever and having a series of teeth corresponding in number with the printing-faces on the printing-wheel, a worm-wheel for rotating said ratchet-wheel, a worm in engagement with said wheel, transmitting mechanism intermediate said worm and an actuating means on the vehicle, and embodying a bell-crank, a ratchet actuated thereby, and having a predetermined number of teeth, a changeable gear rotated by said ratchet, a gear having a predetermined number of teeth secured to said worm, and an adjustably-supported gear intermediate said ratchet-gear and said worm-gear, and means in operative connection with and actuated by said record-sheet mechanism for shifting said vibratory arm transversely of said record-sheet, and comprising a worm, a worm-wheel, and a screw-cam in operative engagement with said vibratory arm.

61. In a recorder, the combination of record-sheet mechanism comprising a timepiece, a drum rotatable with one of the hands of said timepiece, and carrying a record-sheet provided with separate time-spaces denoting similar periods of time duration; and speed-recording means comprising a vibratory arm carrying a printing-wheel having a predetermined number of printing-faces to the mile, means for actuating such vibratory arm, and comprising a rock-shaft, a lever connected therewith, a ratchet-wheel for actuating said lever and having a series of teeth corresponding in number with the printing-faces on the printing-wheel, a worm-wheel for rotating said ratchet-wheel, a worm in engagement with said wheel, transmitting mechanism intermediate said worm and an actuating means on the vehicle, and embodying a bell-crank, a ratchet actuated thereby and having a predetermined number of teeth, a changeable gear rotated by said ratchet, a gear having a predetermined number of teeth secured to said worm, and an adjustably-supported gear intermediate said ratchet-gear and said worm-gear, means in operative connection with and actuated by said record-sheet mechanism for shifting said vibratory arm transversely of said record-sheet, and comprising a worm, a worm-wheel, and a screw-cam in operative engagement with said vibratory arm, and spring-controlled means for returning said vibratory arm to its normal position at a predetermined time.

62. In a recorder, the combination of record-sheet mechanism comprising a timepiece, a drum rotatable with one of the hands of said timepiece, and carrying a record-sheet provided with separate time-spaces denoting similar periods of time duration; and speed-recording means comprising a vibratory arm carrying a printing-wheel having a predetermined number of printing-faces to the mile, means for actuating said vibratory arm, and comprising a rock-shaft, a spring-controlled lever connected therewith, a ratchet-wheel for actuating said lever and having a series of teeth corresponding in number with the printing-faces on the printing-wheel, a worm-wheel for rotating said ratchet-wheel, a worm in engagement with said wheel, transmitting mechanism intermediate said worm and an actuating means on the vehicle, and a buffer for said lever.

63. In a recorder, the combination of record-sheet mechanism comprising a timepiece having a dial and hands, a drum rotatable with the minute-hand thereof and carrying a record-sheet having separate time-spaces denoting similar periods of time duration; and speed-recording mechanism comprising a vibratory arm carrying a printing-wheel having a predetermined number of printing-faces thereon, ratchet mechanism for rotating said printing-wheel, means for inking said wheel, a rock-shaft to which said arm is connected, a spring-controlled lever connected with said rock-shaft, a ratchet-wheel in engagement with said lever and having a series of teeth corresponding in number with the printing-faces of the printing-wheel, a worm-wheel having a predetermined number of teeth for rotating said ratchet-wheel, a worm for actuating said worm-wheel, transmitting means in operative connection with said worm-wheel, and comprising a gear having a predetermined number of teeth, a bell-crank, a ratchet rotated by said bell-crank, and having a predetermined number of teeth, a changeable gear rotated by said ratchet, and an adjustably-supported gear between said worm and ratchet-gears, and means for shifting said vibratory arm and the printing-wheel transversely of the record-sheet, and comprising a worm in operative connection with the minute-hand, a worm-wheel in mesh with said worm and having a predetermined number of teeth, a cam carried by said worm-wheel and in operative engagement with said vibratory arm whereby the recording mechanism is shifted completely across the record-sheet once during each predetermined number of hours, and a spring-controlled device for returning said vibratory arm into its starting position.

64. In a recorder, the combination of record-sheet mechanism comprising a timepiece having a dial and hands, a drum rotatable with the minute-hand, and carrying a record-sheet provided with a helical path having separate time-spaces denoting similar periods of time duration; and speed-recording mechanism comprising a vibratory arm carrying a printing-wheel having thirty-two graduated printing-faces thereon, ratchet mechanism for rotating said printing-wheel, means for inking said wheel, a rock-shaft to which said arm is connected, a spring-controlled lever connected with said rock-shaft, a buffer for said lever, a ratchet-wheel in engagement with said lever and having thirty-two teeth, a sixty-tooth worm-wheel for rotating said ratchet-wheel, a worm for actuating said worm-wheel, transmitting means in operative connection with said worm-wheel, and comprising a twenty-eight-tooth wheel, a bell-crank, a twelve-tooth ratchet rotated thereby, a changeable gear rotated by said ratchet, an adjustably-supported intermediate gear between said worm-gear and ratchet-gear, means for shifting said vibratory arm and the printing-wheel transversely of the record-sheet, and comprising a worm in operative connection with the minute-hand, a forty-eight-tooth worm-wheel in mesh with said worm, a screw-cam carried by said worm-wheel and in operative engagement with a working member carried by said vibratory arm whereby the recording mechanism is shifted completely across the record-sheet once in each twenty-four hours, and a spring-controlled device for returning said vibratory arm to its starting position at a predetermined time.

65. In a recorder, the combination of a timepiece having a dial and hands, a drum rotatable with one of said hands and carrying a record-sheet provided with separate time-spaces denoting similar periods of time duration, recording mechanism comprising a vibratory arm carrying a printing-wheel having a predetermined number of printing-faces, a rock-shaft for vibrating said arm, a lever for actuating said shaft, a ratchet-wheel for actuating said lever, a spring for maintaining said lever in engagement with said ratchet-wheel, a worm-wheel for rotating said ratchet-wheel, a worm in mesh with said worm-wheel, and transmitting means for rotating said worm.

66. In a recorder, the combination of a timepiece having a dial and hands, a drum rotatable with one of said hands and carrying a record-sheet provided with separate time-spaces denoting similar periods of time duration, recording mechanism comprising a vibratory arm carrying a printing-wheel having a predetermined number of printing-faces, means for rotating said wheel, a rock-shaft to which said arm is connected, a lever for actuating said shaft, a ratchet-wheel for actuating said lever, a worm-wheel for rotating said ratchet-wheel, a worm in mesh with said worm-wheel, transmitting means for said worm, and means for shifting said vibratory arm transversely of the record-sheet, and comprising a worm in operative connection with the time mechanism for actuation thereby, a worm-wheel in mesh with said worm, and a cam in engagement with said vibratory arm.

67. In a recorder, the combination of a timepiece having a dial and hands, a drum rotatable with one of said hands and carrying a record-sheet provided with separate time-spaces denoting similar periods of time duration, recording mechanism comprising a vibratory arm carrying a printing-wheel having a predetermined number of printing-faces, means for rotating said wheel, a rock-shaft carrying said arm, a lever for actuating said shaft, a ratchet-wheel for actuating said lever, a worm-wheel for rotating said ratchet-wheel, a worm in mesh with said worm-wheel, transmitting means for said worm, and comprising a gear rigid with said worm, a ratchet, means operative on the travel of the vehicle for actuating said ratchet, a changeable gear rotated by said ratchet, an adjustably-supported gear intermediate said worm and ratchet gears, and means for shifting said vibratory arm transversely of the record-sheet, and comprising a worm in operative connection with the time mechanism for actuation thereby, a worm-wheel in mesh with said worm, and a cam in engagement with said vibratory arm, and means for returning said arm to its starting position.

68. In a recorder, the combination with record-sheet mechanism and with recording mechanism, of transmitting mechanism operative on the travel of the vehicle, to actuate said recording mechanism, and comprising a gear having a predetermined number of teeth, a ratchet likewise having a predetermined number of teeth, means for rotating said ratchet, a changeable gear rotated by said ratchet, and an adjustably-supported gear intermediate said gears.

69. In a recorder, the combination with record-sheet mechanism, and with speed-recording mechanism, of transmitting mechanism for actuating said recording mechanism on the travel of the vehicle, and comprising a gear having a predetermined number of teeth, a ratchet likewise having a predetermined number of teeth, a bell-crank for rotating said ratchet, a changeable gear rotated by said ratchet, and an adjustably-supported gear intermediate said gears.

70. In a recorder, the combination of record-sheet mechanism embodying a record-sheet adapted to be printed upon and alarm-recording mechanism in operative connection with an alarm, and comprising a device having a plurality of printing-faces, means for inking said printing-faces, means for successively bringing each of said printing-faces into position to print on said record-sheet on the sounding of the alarm; means for continuously shifting one of said mechanisms transversely of the other; and means for returning said shifted mechanism to its starting position.

71. In a recorder, the combination of record-sheet mechanism embodying a record-receiving instrumentality having separate time-spaces denoting similar periods of time duration; and an alarm-recording instrumentality comprising a printing-wheel having a series of printing-faces, means for inking said faces, means in operative connection with an alarm for successively bringing each of said printing-faces into printing contact with the record-sheet on the sounding of the alarm, means for shifting one of said instrumentalities transversely of the other; and spring-controlled means for returning the shifted instrumentality to its starting position.

72. In a recorder, the combination of record-sheet mechanism embodying a record-sheet adapted to be printed upon; and alarm-recording mechanism comprising a rock-shaft, a printing-wheel supported thereby and having printing-faces, means for inking said printing-faces, means in position to rotate said printing-wheel on the rocking of said shaft, and means for rocking said shaft on the sounding of an alarm.

73. In a recorder for vehicles, the combination of record-sheet mechanism embodying a record-receiving device; an alarm; a rock-shaft; an alarm-actuator mounted on said rock-shaft; and an impression device supported by and operative on the rocking of said shaft to print on said record-receiving device.

74. In a recorder, the combination of record-sheet mechanism embodying a record-sheet having separate time-spaces denoting similar periods of time duration; an alarm; a rock-shaft; an alarm-actuator mounted on said rock-shaft; a printing-wheel supported by said rock-shaft and having a plurality of printing-faces; means for inking said printing-faces; and means operative on the rocking of said shaft to carry one of the printing-faces of the printing-wheel into contact with the record-sheet.

75. In a recorder, the combination of record-sheet mechanism embodying a record-sheet having separate time-spaces denoting similar periods of time duration; an alarm; a rock-shaft; an alarm-actuator mounted on said rock-shaft; a printing-wheel supported by said rock-shaft and having a plurality of printing-faces; means for inking said printing-faces; means operative on the rocking of said shaft to carry one of the printing-faces of the printing-wheel into contact with the record-sheet; and means operatively connected with the record-sheet mechanism for shifting said alarm-recording mechanism transversely of said record-sheet.

76. In a recorder, the combination of record-sheet mechanism embodying a record-sheet having separate time-spaces denoting similar periods of time duration; an alarm; a rock-shaft; an alarm-actuator mounted on said rock-shaft; a bell-crank shiftably mounted on said rock-shaft; a printing-wheel supported by an arm of said bell-crank and having a series of printing-faces; a toothed device also supported by an arm of said bell-crank, for successively bringing said printing-faces into position to print on said record-sheet on the sounding of the alarm; an inking device carried by the other arm of said bell-crank; and means in operative connection with and actuated by the record-sheet mechanism for shifting said alarm mechanism longitudinally of said rock-shaft.

77. In a recorder, the combination of record-sheet mechanism comprising a timepiece having a dial and hands, a drum rotatable with one of said hands and carrying a record-sheet having separate time-spaces denoting similar periods of time duration; a rock-shaft; a bell-crank mounted on said rock-shaft for shiftable movement longitudinally thereof; a printing-wheel supported by one arm of said rock-shaft, and provided with a series of printing-faces; a toothed device likewise supported by said bell-crank arm for successively bringing the printing-faces of the printing-wheel into printing contact with the record-sheet; an inking device carried by the other arm of said bell-crank; means connected with the rock-shaft to actuate the same and thereby carry the printing-wheel into engagement with the record-sheet on the sounding of the alarm; and means for shifting said alarm mechanism longitudinally of said rock-shaft, and embodying a worm in operative connection with one of the hands of said timepiece, a worm-wheel and a screw-cam rotatable with said worm-wheel.

78. In a recorder, the combination of record-sheet mechanism comprising a timepiece having a dial and hands, and a drum rotatable with one of said hands and carrying a record-sheet having separate time-spaces denoting similar periods of time duration; and alarm-recording mechanism comprising a printing-wheel having a series of printing-faces, means for successively bringing said printing-faces into position to print, means for inking said printing-faces, and means for carrying the printing-wheel into contact with the record-sheet on the sounding of the alarm.

79. In a recorder, the combination of record-sheet mechanism comprising a timepiece having a dial and hands, and a drum rotatable with one of said hands and carrying a record-sheet having separate time-spaces denoting similar periods of time duration; and alarm-recording mechanism comprising a printing-wheel having a series of printing-faces, means for successively bringing said printing-faces into position to print, means for inking said printing-faces, an alarm carried by said recorder, and an actuator for sounding said alarm and for shifting said printing-wheel into contact with the record-sheet.

80. In a recorder, the combination of record-sheet mechanism comprising a timepiece and a record-sheet shiftable thereby; and alarm-recording mechanism comprising a rock-shaft, a bell-crank mounted thereon, a printing-wheel supported thereby and having printing-faces, a guide device for said printing-wheel, means for rotating said printing-wheel on the actuation of said rock-shaft to successively bring its printing-faces into printing position, an inking device carried by said bell-crank, and an actuator carried by said rock-shaft and effective on the sounding of the alarm to shift the printing-wheel into engagement with the record-sheet.

81. In a recorder, the combination of record-sheet mechanism comprising a timepiece and a record-sheet shiftable thereby; and alarm-recording mechanism comprising a rock-shaft, a bell-crank mounted thereon, a printing-wheel supported thereby and having printing-faces, a guide device for said printing-wheel, means for rotating said printing-wheel on the actuation of said rock-shaft to successively bring its printing-faces into printing position, an inking device carried by said bell-crank, an actuator carried by said rock-shaft and effective on the sounding of an alarm to shift the printing-wheel into engagement with the record-sheet, said actuator constituting the clapper of the alarm, and a gong carried by said recorder.

82. In a recorder, the combination of record-sheet mechanism embodying a shiftable record-sheet; speed-recording mechanism comprising a vibratory arm carrying a printing-wheel having a predetermined number of printing-faces to the mile, means for successively actuating said printing-faces into printing position, and means for vibrating such arm on the travel of the vehicle; and an alarm-recording mechanism comprising a printing-wheel having a series of printing-faces, means for successively bringing such printing-faces into printing position, and means for shifting said printing-wheel on the sounding of an alarm.

83. In a recorder, the combination of record-sheet mechanism embodying a shiftable record-sheet, speed-recording means comprising a vibratory arm, a printing-wheel carried thereby and having a predetermined number of graduated printing-faces, means for inking said faces, means for bringing said printing-faces successively into printing position, and means for vibrating said arm on the travel of the vehicle, and alarm-recording mechanism also comprising a vibratory device, a printing-wheel carried thereby and provided with a series of printing-faces, means for inking said printing-faces, means for successively bringing each of such printing-faces into printing position, and means for shifting said printing-wheel into position to print on said record-sheet.

84. In a recorder, the combination of record-sheet mechanism embodying a shiftable record-sheet; speed-recording means comprising a vibratory arm, a printing-wheel carried thereby and having a number of printing-faces, means for inking said faces, means for bringing said printing-faces successively into printing position, and means for vibrating said arm on the travel of the vehicle; alarm-recording mechanism also comprising a vibratory device, a printing-wheel carried thereby and provided with a series of printing-faces, means for inking said printing-faces, means for successively bringing each of such printing-faces into printing position, and means for shifting said printing-wheel into position to print on said record-sheet; and means for shifting said record and alarm mechanisms transversely of said record-sheet.

85. In a recorder, the combination of record-sheet mechanism embodying a shiftable record-sheet; speed-recording means comprising a vibratory arm, a printing-wheel carried thereby and having a predetermined number of graduated printing-faces, means for inking said faces, means for bringing said printing-faces successively into printing position, and means for vibrating said arm on the travel of the vehicle; and alarm-recording mechanism also comprising a vibratory device, a printing-wheel carried thereby and provided with a series of inclined printing-faces, means for inking said printing-faces, means for successively bringing each of such printing-faces into printing position, and means for carrying said printing-wheel into position to print on said record-sheet.

86. In a recorder, the combination of record-sheet mechanism embodying a shiftable record-sheet; speed-recording means comprising a vibratory arm, a printing-wheel carried thereby and having printing-faces, means for inking said faces, means for bringing said printing-faces successively into printing position, and means for vibrating said arm on the travel of the vehicle; and alarm-recording mechanism also comprising a vibratory device, a printing-wheel carried thereby and provided with a series of printing-faces, means for inking said printing-faces, means for successively bringing each of such printing-faces into printing position, and means for carrying said printing-wheel into position to print on said record-sheet, and comprising an actuator; and an alarm in position to be sounded by said actuator.

87. In a recorder, the combination of record-sheet mechanism comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having a series of printing-faces, means for inking said printing-faces, means for successively bringing such printing-faces into printing position, and means for vibrating said arm; alarm-recording mechanism actuated on the sounding of an alarm to print on said record-sheet; and means in operative connection with and actuated by said timepiece for shifting said recording mechanism transversely of said record-sheet.

88. In a recorder, the combination of record-sheet mechanism comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having a series of printing-faces, means for inking said printing-faces, means for successively bringing such printing-faces into printing position, and means for vibrating said arm and comprising a rock-shaft, a lever connected therewith, a ratchet-wheel, a worm-wheel, a worm in mesh therewith, and transmitting mechanism effective on the travel of the vehicle to rotate said worm; and alarm-recording mechanism actuated on the sounding of an alarm to print on said record-sheet.

89. In a recorder, the combination of record-sheet mechanism comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having a series of printing-faces, means for inking said printing-faces, means for successively bringing such printing-faces into printing position, and means for vibrating said arm, and comprising a rock-shaft, a lever connected therewith, a ratchet-wheel, a worm-wheel, a worm in mesh therewith, and transmitting mechanism effective on the travel of the vehicle to rotate said worm and comprising a ratchet, means for shifting the same, a changeable gear rotated by said ratchet, a gear fixedly secured to said worm for rotating the same, and an adjustably-supported gear intermediate said worm and ratchet gears; and alarm-recording mechanism actuated on the sounding of an alarm to print on said record-sheet.

90. In a recorder, the combination of record-sheet mechanism comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having a series of printing-faces, means for inking said printing-faces, means for successively bringing such printing-faces into printing position, and means for vibrating said arm and comprising a rock-shaft, a lever connected therewith, a ratchet-wheel, a worm-wheel, a worm in mesh therewith, and transmitting mechanism effective on the travel of the vehicle to rotate said worm and comprising a ratchet, means for shifting the same, a changeable gear rotated by said ratchet, a gear fixedly secured to said worm for rotating the same, and an adjustably-supported gear intermediate said worm and ratchet gears; alarm-recording mechanism actuated on the sounding of an alarm to print on said record-sheet; and means for shifting said recording mechanisms transversely of said record-sheet.

91. In a recorder, the combination of record-sheet mechanism comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having a series of printing-faces, means for inking said printing-faces, means for successively bringing such printing-faces into printing position, and means for vibrating said arm and comprising a rock-shaft, a lever connected therewith, a ratchet-wheel, a worm-wheel, a worm in mesh therewith, and transmitting mechanism effective on the travel of the vehicle to rotate said worm, and comprising a ratchet, means for shifting the same, a changeable gear rotated by said ratchet, a gear fixedly secured to said worm for rotating the same, and an adjustably-supported gear intermediate said worm and ratchet gears; alarm-recording mechanism actuated on the sounding of an alarm to print on said record-sheet; means for shifting said recording mechanisms transversely of said record-sheet, and comprising a worm actuated by said timepiece, a worm-wheel in mesh with said worm, and a cam rotated by said worm-wheel and in engagement with said vibratory arm; and spring-controlled means for returning said recording mechanisms to their starting positions at a predetermined time.

92. In a recorder, the combination of record-sheet mechanism comprising a timepiece having a dial and hands, a drum rotatable with one of said hands and carrying a record-sheet provided with separate time-spaces denoting similar periods of time duration; alarm-recording mechanism actuated on the sounding of an alarm, to print on said record-sheet, and comprising a printing-wheel having a series of printing-faces, means for inking said printing-faces, and means for successively bringing each of said printing-faces into printing position; and speed-recording means actuated on the travel of the vehicle to print on said record-sheet.

93. In a recorder, the combination of record-sheet mechanism comprising a timepiece having a dial and hands, a drum rotatable with one of said hands and carrying a record-sheet provided with separate time-spaces denoting similar periods of time duration; alarm-recording mechanism actuated on the sounding of an alarm to print on said record-sheet, and comprising a printing-wheel having a series of printing-faces, means for inking said printing-faces, means for successively bringing each of said printing-faces into printing position, an alarm carried by said recorder, and an actuator for sounding said alarm, and simultaneously carrying the printing-wheel into contact with the record-sheet; and speed-recording means actuated on the travel of the vehicle to print on said record-sheet.

94. In a recorder, the combination of record-sheet mechanism comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having a series of printing-faces, means for inking said printing-faces, means for successively bringing such printing-faces into printing position, and means for vibrating said arm, and comprising a rock-shaft, a lever connected therewith, a ratchet-wheel in engagement with said lever, a worm-wheel rotating said ratchet-wheel, a worm in mesh with said worm-wheel, and transmitting mechanism effective on the travel of the vehicle to rotate said worm; and alarm-recording mechanism comprising a rock-shaft, a printing-wheel supported thereby and having a series of printing-faces, means for inking said printing-faces, means for successively bringing said printing-faces into position to print on the record-sheet, and means for actuating said rock-shaft thereby to carry the printing-wheel into contact with the record-sheet on the sounding of the alarm.

95. In a recorder, the combination of record-sheet mechanism comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having a series of printing-faces, means for inking said printing-faces, a means for successively bringing such printing-faces into printing position, and means for vibrating said arm, and comprising a rock-shaft, a lever connected therewith, a ratchet-wheel in engagement with said lever, a worm-wheel rotating said ratchet-wheel, a worm in mesh with said worm-wheel, and transmitting mechanism effective on the travel of the vehicle to rotate said worm; alarm-recording mechanism comprising a rock-shaft, a printing-wheel supported thereby and having a series of printing-faces, means for inking said printing-faces, means for successively bringing said printing-faces into position to print on the record-sheet, and means for actuating said rock-shaft thereby to carry the printing-wheel into contact with the record-sheet on the sounding of the alarm; and means actuated by one of said timepiece-hands for shifting said recording mechanism transversely of said record-sheet.

96. In a recorder, the combination of record-sheet mechanism comprising a timepiece having a dial and hands, a drum rotatable with one of said hands and carrying a record-sheet provided with separate time-spaces denoting similar periods of time duration;

speed-recording mechanism comprising a vibratory arm, a printing-wheel carried thereby and having a series of printing-faces, means for inking said printing-faces, means for successively bringing such printing-faces into printing position, and means for vibrating said arm and compristing a rock-shaft, a lever connected therewith, a ratchet-wheel in engagement with said lever, a worm-wheel rotating said ratchet-wheel, a worm in mesh with said worm-wheel, and transmitting mechanism effective on the travel of the vehicle to rotate said worm; alarm-recording mechanism comprising a rock-shaft, a printing-wheel supported thereby and having a series of printing-faces, means for inking said printing-faces, means for successively bringing said printing-faces into position to print on the record-sheet, and means for actuating said rock-shaft thereby to carry the printing-wheel into contact with the record-sheet on the sounding of the alarm; means for shifting said recording mechanisms transversely of said record-sheet, and comprising a worm in operative connection with the timepiece, a worm-wheel in mesh with said worm, a screw-cam rotated by said worm and in operative engagement with said vibratory arm; and spring-controlled means for returning said recording mechanisms to their starting positions at a predetermined time.

97. In a recorder, the combination of record-sheet mechanism comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having printing-faces, means for inking said printing-faces, means for successively bringing such printing-faces into printing position, and means for vibrating said arm and comprising a rock-shaft, a spring-controlled lever connected therewith, a ratchet-wheel in engagement with said lever, a worm-wheel rotating said ratchet-wheel, a worm in mesh with said worm-wheel, and transmitting mechanism effective on the travel of the vehicle to rotate said worm, and comprising a ratchet, means for rotating the same, a changeable gear rotated by said ratchet, a gear rigid with said worm, and an adjustably-supported gear intermediate said worm and ratchet gears; alarm-recording mechanism comprising a rock-shaft, a printing-wheel supported thereby and having a series of printing-faces, an inking device for said printing-wheel, means for successively bringing said printing-faces into printing position, an actuator mounted on said rock-shaft and operative to carry the printing-wheel into position to print on the record-sheet on the sounding of the alarm; and means for shifting said recording mechanisms transversely of said record-sheet.

98. In a recorder, the combination of record-sheet mechanism, comprising a timepiece having a dial and hands, a drum rotatable with one of said hands and carrying a record-sheet provided with separate time-spaces denoting similar periods of time duration; speed-recording mechanism comprising a vibratory arm, a printing-wheel carried thereby and having a series of graduated printing-faces, means for inking said printing-faces, means for successively bringing said printing-faces into printing position, and means for vibrating said arm and comprising a rock-shaft, a spring-controlled lever connected therewith, a ratchet-wheel in engagement with said lever, a worm-wheel rotating said ratchet-wheel, a worm in mesh with said worm-wheel, and transmitting mechanism effective on the travel of the vehicle to rotate said worm and comprising a ratchet, means for rotating the same, a changeable gear rotated by said ratchet, a gear rigid with said worm, and an adjustably-supported gear intermediate said worm and ratchet gears; alarm-recording mechanisms comprising a rock-shaft, a printing-wheel supported thereby, and having a series of inclined printing-faces, an inking device for said printing-wheel, means for successively bringing said printing-faces into printing position, an actuator mounted on said rock-shaft and operative to carry said printing-wheel into position to print on the record-sheet on the sounding of the alarm; means for shifting said recording mechanisms transversely of the record-sheet and comprising a worm in operative connection with one of the hands of said timepiece, a worm-wheel in mesh with said worm, a screw-cam rotated by said worm-wheel and in operative engagement with said vibratory arm; and spring-controlled means for returning said recording mechanisms to their starting positions at a predetermined time.

99. In a recorder, the combination of record-sheet mechanism embodying a shiftable record-sheet, and speed-recording means operative on the travel of the vehicle, and embodying a printing-wheel having a series of graduated printing-faces each located transverse to the direction of travel of the record-sheet.

100. In a recorder, the combination of record-sheet mechanism embodying a shiftable record-sheet; and alarm-recording means operative on the sounding of the alarm, and embodying a printing-wheel having a series of printing-faces, each located at an angle to the plane of the axis of said wheel.

101. In a recorder, the combination of record-sheet mechanism embodying a shiftable record-sheet; speed-recording mechanism actuated on the travel of the vehicle, and embodying a printing-wheel having a series of printing-faces located transverse to the direction of travel of the record-sheet; and alarm-recording mechanism actuated on the sounding of the alarm, and embodying a printing-wheel having a series of printing-faces located at an angle to the direction of travel of said sheet.

102. In a recorder, the combination of record-sheet mechanism embodying a shiftable record-sheet; speed-recording mechanism actuated on the travel of the vehicle and embodying a printing-wheel having a series of printing-faces located transverse to the direction of travel of the record-sheet; and alarm-recording mechanism actuated on the sounding of the alarm, and embodying a printing-wheel having a series of printing-faces located at an angle to the direction of travel of said sheet, the organization being such that the alarm-record is printed at a point in advance of the speed-record.

103. In a recorder, the combination of record-sheet mechanism embodying a record-sheet; speed-recording means actuated on the travel of the vehicle, and embodying a printing-wheel having a series of printing-faces adapted to print on said sheet; and alarm-recording mechanism actuated on the sounding of the alarm, and embodying a printing-wheel having a series of printing-faces located to print on the record-sheet at an angle to the record made by said speed-recording wheel.

104. In a recorder, the combination of record-sheet mechanism embodying a record-sheet provided with separate time-spaces denoting similar periods of time duration; speed-recording means operative on the travel of the vehicle, and embodying a printing-wheel; alarm-recording means operative on the sounding of the alarm, and likewise embodying a printing-wheel, each of said wheels having a series of printing-faces, and one of said wheels having its printing-faces located at an angle to the printing-faces of the other wheel; and means for shifting said recording mechanisms transversely of said record-sheet.

105. In a recorder, the combination of a timepiece, a drum rotated thereby; a record-sheet carried by said drum and provided with separate time-spaces denoting similar periods of time duration; speed-recording means operative on the travel of the vehicle, and embodying a printing-wheel; alarm-recording means operative on the sounding of the alarm, and likewise embodying a printing-wheel, each of said wheels having a series of printing-faces, and one of said wheels having its printing-faces located at an angle to the printing-faces of the other wheel; means for successively bringing the printing-faces of each printing-wheel into printing position; and inking means for each of said printing-wheels.

106. In a recorder, the combination of record-sheet mechanism embodying a record-sheet; combined alarm and trip recording mechanism comprising a printing-wheel having a series of trip-indicating printing-faces, means for shifting said printing-wheel into position to print on the record-sheet on the sounding of an alarm, and means for locating the desired printing-face in position to successively print on said record-sheet each time said alarm is sounded.

107. In a recorder, the combination of record-sheet mechanism embodying a record-receiving instrumentality, a combined alarm and trip recording instrumentality, comprising a trip-indicating printing-wheel having a series of printing-faces, means for shifting said printing-wheel into position to print on the record-sheet on the sounding of the alarm, and means for locating the desired printing-face in position to successively print on said record-sheet; and means for shifting one of said instrumentalities transversely of the other.

108. In a recorder, the combination of record-sheet mechanism embodying a record-sheet; combined alarm and trip recording mechanism comprising a printing-wheel having a series of trip-indicating printing-faces, means for shifting said printing-wheel into position to print on the record-sheet on the sounding of the alarm, and means for bringing and locating the desired printing-face in position to print on said record-sheet each time the alarm is sounded; means for shifting said combined alarm and trip recording mechanism transversely of the record-sheet; and means for returning said recording mechanism to its starting position.

109. In a recorder, the combination of record-sheet mechanism embodying a record-sheet; combined alarm and trip recording mechanism comprising a printing-wheel having a series of trip-indicating printing-faces, means for shifting said printing-wheel into position to print on the record-sheet on the sounding of the alarm, and means for bringing and locating the desired printing-face in position to print on said record-sheet each time the alarm is sounded, and comprising a dial having symbols corresponding with those of the printing-wheel, and an indicator adapted to be moved into position contiguous to any one of said symbols.

110. In a recorder, the combination of record-sheet mechanism embodying a record-sheet; combined alarm and trip recording mechanism comprising a rock-shaft, a printing-wheel supported thereby having a series of trip-indicating printing-faces, a rock-shaft actuator, and means for locating the desired printing-face in position to successively print on said record-sheet and comprising a plurality of transmitting-gears, a shaft supporting one of said gears, a pinion mounted on said shaft, a trip-indicating dial provided with symbols corresponding to those on the printing-wheel, an index device having a gear in mesh with said pinion and adjustable on said dial into position contiguous to any one of said symbols.

111. In a recorder, the combination of record-sheet mechanism embodying a record-sheet; combined alarm and trip recording mechanism comprising a rock-shaft, a bell-crank mounted thereon, a printing-wheel supported by one of the arms thereof and having a series of trip-indicating printing-faces, an inking device carried by the other arm of said rock-shaft, a gear-carrying shaft provided with a gear fixed thereto, a gear loosely mounted on said rock-shaft, gear mechanism in mesh with said loosely-mounted gear for rotating said printing-wheel, a trip-indicating dial having symbols thereon corresponding to the symbols of the printing-wheel, an index device adjustable into position contiguous to any one of said symbols, a gear actuated by said index device, a gear located on said gear-carrying shaft and in mesh with said index-device gear, whereby on the shifting of such index device the printing-wheel is correspondingly shifted, and an actuator carried by said rock-shaft for shifting said printing-wheel into position to print on the record-sheet.

112. In a recorder, the combination of record-sheet mechanism embodying a record-sheet; combined alarm and trip recording mechanism comprising a rock-shaft, a bell-crank mounted thereon, a printing-wheel supported by one of the arms thereof and having a series of trip-indicating printing-faces, an inking device carried by the other arm of said rock-shaft, a gear-carrying shaft provided with a gear located thereon for rotary movement therewith and longitudinal movement relatively thereto, a gear loosely mounted on said rock-shaft, gear mechanism in mesh with said loosely-mounted gear for rotating said printing-wheel, a trip-indicating dial having symbols thereon corresponding to the printing-faces of the printing-wheel, an index device adjustable into position contiguous to any one of said symbols, a gear actuated by said index device, a gear located on said gear-carrying shaft and in mesh with said index-device gear, whereby on the shifting of such index device the printing-wheel is correspondingly shifted, and an actuator carried by said rock-shaft for shifting said printing-wheel into position to print on the record-sheet; and means for shifting said combined alarm and trip recording mechanism transversely of the record-sheet.

113. In a recorder, the combination of record-sheet mechanism embodying a timepiece, a drum rotatable with one of the hands thereof and carrying a record-sheet provided with separate time-spaces denoting similar periods of time duration; and combined alarm and trip recording mechanism comprising a printing-wheel having a series of printing-faces, means for shifting said printing-wheel into position to print on the record-sheet on the sounding of the alarm, and means for locating the desired printing-face in position to successively print on said record-sheet.

114. In a recorder for vehicles, the combination of record-sheet mechanism embodying a record-sheet provided with separate time-spaces denoting similar periods of time duration; speed-recording mechanism actuated on the travel of the vehicle to print on said record-sheet; alarm-recording mechanism actuated on the sounding of the alarm to print on said record-sheet; cyclometer mechanism connected with and actuated through the medium of the speed-recording mechanism and operative on the travel of the vehicle to indicate the number of miles traveled thereby; and means for shifting the recording mechanism transversely of and continuously across the record-sheet during the production of the record.

115. In a recorder, the combination of record-sheet mechanism embodying a timepiece and a record-sheet rotated thereby and provided with separate time-spaces denoting similar periods of time duration; speed-recording mechanism actuated on the travel of the vehicle to print on said record-sheet; alarm-recording mechanism actuated on the sounding of an alarm to print on said record-sheet; cyclometer mechanism connected with and actuated through the medium of the speed-recording mechanism and operative on the travel of the vehicle to indicate the number of miles traveled thereby; means for shifting said recording mechanisms transversely of the record-sheet; and spring-actuated means for returning said recording mechanisms to their starting positions.

116. In a recorder for vehicles, the combination of record-sheet mechanism embodying a timepiece and a record-sheet shifted thereby and provided with separate time-spaces denoting similar periods of time duration; speed-recording mechanism actuated on the travel of the vehicle to print on said record-sheet; combined trip and alarm recording mechanism actuated on the sounding of the alarm to print on said record-sheet to indicate not only the sounding of the alarm but the trip during which such alarm was sounded; and cyclometer mechanism connected with and actuated through the medium of the speed-recording mechanism and operative on the travel of the vehicle to register the number of miles traveled thereby.

117. In a recorder for vehicles, the combination of a casing provided with a door; record-sheet mechanism embodying an automatically-shiftable record-sheet; automatically-operative event-impression-producing mechanism actuated on the occurrence of the event to print on the record-sheet; and means actuated on the opening of the door to throw said impression-producing mechanism out of its working position.

118. In a recorder, the combination of a casing having a door; record-sheet mechanism located therein; event-impression-producing mechanism also located in said casing and embodying a rock-shaft, an arm rigid with said rock-shaft, an actuating-arm in engagement with said rock-shaft arm and operative on the opening of the door to rock said rock-shaft and thereby shift said impression-producing mechanism out of its working position.

119. In a recorder, the combination of a casing having a door; record-sheet mechanism located therein; speed-recording mechanism embodying a vibratory arm and a rock-shaft supporting said arm; and means operative on the opening of said door to throw said speed-recording mechanism out of its working position.

120. In a recorder, the combination of a casing having a door; record-sheet mechanism comprising a timepiece and a removable drum carrying a record-sheet; event-impression-producing mechanism actuated on the occurrence of the event to print on the record-sheet; and means operative on the opening of the door, to shift said event-impression-producing mechanism out of its printing position, and thereby permit the removal of said record-sheet-carrying drum.

121. In a recorder, the combination of a casing provided with a door, record-sheet mechanism located in said casing and comprising a timepiece and a removable drum rotatable with one of the hands thereof and carrying a record-sheet; recording mechanism embodying a vibratory arm and a rock-shaft for supporting said arm; an arm for rocking said rock-shaft, an actuating-arm in engagement with said rock-arm; and means carried by said door for engaging said actuating-arm, whereby on the opening of such door the recording mechanism is thrown out of its working position to permit the removal of the record-sheet-carrying drum.

122. In a recorder, the combination of record-sheet mechanism embodying a removable record-sheet; event-impression-producing mechanism operative to print on said record-sheet; cyclometer mechanism operative to register the number of miles traveled by the vehicle; a casing for said mechanisms and having a series of doors, one located in position to permit the inspection of the impression-producing mechanism, another in position to permit the inspection of the cyclometer mechanism, and another in position to permit the removal of the record-sheet; and means for unlocking all of said doors simultaneously.

123. In a recorder, the combination of a casing provided with a door; record-sheet mechanism located in said casing and comprising a timepiece, a removable drum rotatable with one of the hands thereof and carrying a record-sheet; recording mechanism embodying a movable arm and a rock-shaft for supporting said arm, an arm for rocking said rock-shaft, an actuating-arm in engagement with said rock-arm, means carried by said door for engaging said actuating-arm, whereby on the opening of such door the recording mechanism is thrown out of its working position to permit the removal of the drum; a door in position to permit the removal of said drum; cyclometer mechanism; a door in position to permit the inspection thereof; and means for locking and unlocking all of said doors simultaneously.

124. A casing for the reception of recording mechanism and comprising a body having a clock-dial door and a mechanism-inspecting door, and locking means for locking and unlocking said doors simultaneously.

125. A casing for the reception of recording mechanism and comprising a body having a clock-dial door and a plurality of mechanism-inspecting doors, and means for locking and unlocking all of said doors simultaneously.

126. A recorder-casing comprising a body having a dial-door and a pair of mechanism-inspecting doors, means for locking and unlocking all of said doors simultaneously, and comprising a series of three bolts, one for each door, and a locking-tumbler for maintaining all of said bolts in position.

127. A recorder-casing comprising a body, a dial-door shiftably secured to one face thereof, a pair of doors shiftably secured to another face thereof, a locking-bolt for each of said doors, and a spring-controlled tumbler for maintaining each of said bolts in its locking position, the organization being such that all of said bolts are actuated simultaneously to lock or unlock the doors.

128. In a recorder, the combination of a casing; record-sheet mechanism located therein; a pair of brackets, one for supporting one mechanism, and the other another mechanism; record-producing means; and actuating mechanism therefor embodying transmitting means, the organization being such that the record-producing means may be assembled with one of said brackets prior to its location within the casing, while the actuating mechanism may be assembled with the other bracket prior to its assemblage with said casing.

129. In a recorder, the combination of a casing; a pair of removable brackets supported by said casing, one located partly within and partly without said casing; impression-producing mechanism; and actuating mechanism for said impression-producing mechanism, said impression-producing mechanism being supported by one of said removable brackets, and said actuating mechanism being supported by the bracket located partly within and partly without said casing, the organization being such that the respective mechanisms may be assembled with their respective brackets prior to the assemblage of such brackets with the casing.

130. In a recorder, the combination of record-sheet mechanism including a rotatable record-receiving instrumentality having inclined ruling thereon forming a spiral path, such path having separate time-spaces denoting similar periods of time duration; an event-impression-producing instrumentality for producing a record on said record-receiving instrumentality; means for shifting one of said instrumentalities relatively to the other; and spring-controlled means for returning said shifted instrumentality to its starting position.

HORACE L. ARNOLD.

Witnesses:
 C. A. WEED,
 S. NELSON LYONS.